US009890672B2

United States Patent
Miyanishi et al.

(10) Patent No.: US 9,890,672 B2
(45) Date of Patent: Feb. 13, 2018

(54) COMBUSTION GAS COOLING APPARATUS, DENITRATION APPARATUS HAVING THE COMBUSTION GAS COOLING APPARATUS, AND COMBUSTION GAS COOLING METHOD

(75) Inventors: Hideo Miyanishi, Tokyo (JP); Yasuyuki Kuroda, Tokyo (JP); Rand Drake, Newport Beach, CA (US); Albert Bednarski, Newport Beach, CA (US); Paul Harris, Canton, MI (US); James Paul, Carmel, CA (US); Kevin Linfield, Amherstburg (CA)

(73) Assignees: MITSUBISHI HITACHI POWER SYSTEMS, LTD., Yokohama-shi (JP); MITSUBISHI HITACHI POWER SYSTEMS AMERICAS, INC., Lake Mary, FL (US)

(*) Notice: Subject to any disclaimer, the term of this patent is extended or adjusted under 35 U.S.C. 154(b) by 289 days.

(21) Appl. No.: 14/418,756

(22) PCT Filed: Sep. 6, 2012

(86) PCT No.: PCT/US2012/053872
§ 371 (c)(1),
(2), (4) Date: Jul. 29, 2015

(87) PCT Pub. No.: WO2014/039039
PCT Pub. Date: Mar. 13, 2014

(65) Prior Publication Data
US 2015/0337700 A1    Nov. 26, 2015

(51) Int. Cl.
*F01N 3/05* (2006.01)
*F01N 3/02* (2006.01)
(Continued)

(52) U.S. Cl.
CPC ........... *F01N 3/02* (2013.01); *B01D 53/8631* (2013.01); *F01D 25/12* (2013.01); *F01D 25/30* (2013.01);
(Continued)

(58) Field of Classification Search
CPC ... F01N 3/02; F01N 3/05; F01D 25/08; F01D 25/12
See application file for complete search history.

(56) References Cited

U.S. PATENT DOCUMENTS

| 4,950,473 A | 8/1990 | Flockenhaus et al. |
| 5,555,718 A | 9/1996 | Anderson et al. |

(Continued)

FOREIGN PATENT DOCUMENTS

| JP | 01-281322 A | 11/1989 |
| JP | 04-004021 A | 1/1992 |

(Continued)

OTHER PUBLICATIONS

Notification of Reasons for Rejection dated Jan. 5, 2016, issued in counterpart Japanese Patent Application No. 2015-526509 with English translation. (16 pages).

(Continued)

*Primary Examiner* — Jonathan Matthias
(74) *Attorney, Agent, or Firm* — Westerman, Hattori, Daniels & Adrian, LLP

(57) ABSTRACT

A combustion gas cooling apparatus includes a cooling duct from which a cooling gas at a temperature lower than the temperature of a combustion gas flows out into a mixing duct to form a mixed gas in which the combustion gas and the cooling gas are mixed. The cooling duct has cooling gas flow inlets into which the cooling gas flows, a plurality of cooling gas outflow apertures through which the cooling gas having flowed into the cooling gas flow inlets flows out into (Continued)

the mixing duct, and distribution passages through which the cooling gas having flowed into the cooling gas flow inlets is distributed to the plurality of cooling gas outflow apertures.

24 Claims, 20 Drawing Sheets

(51) Int. Cl.
*F01N 3/20* (2006.01)
*B01D 53/86* (2006.01)
*F01D 25/12* (2006.01)
*F01D 25/30* (2006.01)
*F02C 7/141* (2006.01)

(52) U.S. Cl.
CPC ............... *F01N 3/05* (2013.01); *F01N 3/208* (2013.01); *F02C 7/141* (2013.01); *B01D 2251/2062* (2013.01); *B01D 2255/20707* (2013.01); *B01D 2255/20723* (2013.01); *B01D 2255/20776* (2013.01); *B01D 2257/404* (2013.01); *F01N 2470/04* (2013.01); *Y02T 10/20* (2013.01)

(56) References Cited

U.S. PATENT DOCUMENTS

| | | | |
|---|---|---|---|
| 7,069,716 | B1 | 7/2006 | Childers |
| 7,383,850 | B2 * | 6/2008 | Buzanowski .......... B01D 53/79 137/1 |
| 7,523,602 | B2 | 4/2009 | Patel et al. |
| 2010/0011738 | A1 | 1/2010 | Zhang |
| 2010/0205927 | A1 | 8/2010 | Eiteneer et al. |
| 2011/0036066 | A1 | 2/2011 | Zhang et al. |
| 2011/0158876 | A1 | 6/2011 | Buzanowski et al. |

FOREIGN PATENT DOCUMENTS

| | | |
|---|---|---|
| JP | 08-108045 A | 4/1996 |
| JP | 2004-308949 A | 11/2004 |
| JP | 2010-031869 A | 2/2010 |
| JP | 2011-038517 A | 2/2011 |

OTHER PUBLICATIONS

Decision to Grant a Patent dated Aug. 30, 2016, issued in counterpart Japanese Patent Application No. 2015-526509. An explanation of relevance states "The Decision to Grant a Patent was been received". (3 pages).
International Search Report dated Nov. 23, 2012, issued in corresponding Internationa Application No. PCT/US2012/053872 (2 pages).
Written Opinion dated Nov. 23, 2012, issued in corresponding Internationa Application No. PCT/US2012/053872 (7 pages).
Notification Concerning Transmittal of International Preliminary Report on Patent Ability of International Application No. PCT/US2012/053872 dated Mar. 19, 2015 with Forms PCT/IB/373 and PCT/ISA/237 (9 pages).

* cited by examiner

COMBUSTION GAS COOLING APPARATUS, DENITRATION APPARATUS HAVING THE COMBUSTION GAS COOLING APPARATUS, AND COMBUSTION GAS COOLING METHOD

TECHNICAL FIELD

The present invention relates to a combustion gas cooling apparatus, a denitration apparatus having the combustion gas cooling apparatus, and a combustion gas cooling method.

BACKGROUND ART

Conventionally, a denitration apparatus decomposing nitrogen oxides contained in a combustion gas discharged from a combustion engine such as a gas turbine, and preventing an adverse effect on an atmospheric environment has been known. Further, it is known that when the combustion gas with temperature exceeding allowable temperature flows into the denitration apparatus including a catalyst part which decomposes nitrogen oxides, performance degradation of the denitration apparatus, or a failure of the denitration apparatus occurs. There is known a denitration apparatus in which a cooling apparatus which cools a combustion gas is installed at an upstream side of a catalyst part in order to prevent the troubles like this (refer to, for example, Patent Literature 1). As methods for cooling a combustion gas, a method for transferring thermal energy of a combustion gas to a cooling medium and a method for mixing a cooling medium and a combustion gas are known.

CITATION LIST

Patent Literature

{PTL 1}
Japanese Unexamined Patent Application, Publication No. Hei 1-281322

SUMMARY OF INVENTION

Technical Problem

However, the cooling apparatus disclosed in Patent Literature 1 is not intended to mix a cooling medium and a combustion gas, but supplies the cooling medium which recovers heat from the combustion gas to a waste heat recovery boiler. Accordingly, as compared with the cooling apparatus with a method which mixes a cooling medium and a combustion gas, a sufficient cooling cannot be achieved.

Further, when a cooling medium is mixed with a combustion gas, it is required that the cooling medium and the combustion gas are sufficiently mixed to make the temperature distribution of the mixed gas uniform.

Also, in the case of disposing in a duct through which a combustion gas flows a cooling duct through which a cooling gas flows out, there is a need to suitably protect an outer wall of the cooling duct from deformation or breakage due to the heat in the combustion gas.

The present invention has been achieved in consideration of these circumstances and an object of the present invention is to provide a combustion gas cooling apparatus, a denitration apparatus having the combustion gas cooling apparatus and a combustion gas cooling method that enable cooling by making sufficiently uniform the temperature distribution in a gas supplied to a catalyticcatalyst part in which nitrogen oxides are decomposed.

Another objective of the present invention is to provide a combustion gas cooling apparatus, and a combustion gas cooling method that are capable of suitably protecting from the heat in a combustion gas a cooling duct from which a cooling gas at a temperature lower than that of the combustion gas flows out, and with which a mixed gas in which the combustion gas and a cooling gas are mixed is formed.

Solution to Problem

To achieve the above-described objects, according to the present invention, means described below are adopted.

A combustion gas cooling apparatus according to a first aspect of the present invention includes a first duct through which a combustion gas flows travels, and a cooling duct from which a coolantcooling gas at a temperature lower than the temperature of the combustion gas flows out into the first duct to form a mixed gas in which the combustion gas and the cooling gas are mixed, the cooling duct having a cooling gas flow inlet into which the cooling gas flows, a plurality of cooling gas flow outlets through which the cooling gas having flowed in through the cooling gas flow inlet flows out into the first duct, and a distribution passage through which the cooling gas having flowed into the cooling gas flow inlet is distributed to the plurality of cooling gas flow outlets.

In the combustion gas cooling apparatus according to the first aspect of the present invention, the cooling gas having flowed into the cooling duct is distributed to the plurality of cooling gas flow outlets through the distribution passage to flow out through the cooling gas flow outlets. Therefore the cooling gas is suitably mixed with the combustion gas. In this way, cooling by making sufficiently uniform the temperature distribution in the gas supplied to a catalyst part in which nitrogen oxides are decomposed is enabled.

In the combustion gas cooling apparatus according to the first aspect of the present invention, an arrangement may be adopted in which the cooling gas flows into the cooling gas flow inlet along a direction intersecting the direction of flow of the combustion gas, and the plurality of cooling gas flow outlets are disposed at different positions along the intersecting direction. Doing so enables the cooling gas to flow out from the different positions in the direction intersecting the direction of flow of the combustion gas to perform cooling by making sufficiently uniform the temperature distribution in the gas supplied to the catalyst part.

In the above-described arrangement, the plurality of cooling gas flow outlets may include a first cooling gas flow outlet and a second cooling gas flow outlet open in a direction different from the direction in which the first cooling gas flow outlet is open. This arrangement enables the cooling gas to flow out in different directions and mix easily with the combustion gas to make more uniform the temperature distribution in the gas supplied to the catalyst part.

The first cooling gas flow outlet and the second cooling gas flow outlet may be alternately disposed along the intersecting direction. This arrangement enables promoting mixing of the cooling gas and the combustion gas to make more uniform the temperature distribution in the gas supplied to the catalyst part.

In the above-described arrangement, the cooling duct may include a first cooling gas flow inlet into which the cooling gas flows in a first direction along the intersecting direction, a second cooling gas flow inlet into which the cooling gas flows along a second direction opposite to the first direction, a first distribution passage through which the cooling gas having flowed into the first cooling gas flow inlet is distributed to the plurality of cooling gas flow outlets, and a second distribution passage through which the cooling gas having flowed into the second cooling gas flow inlet is distributed to the plurality of cooling gas flow outlets. This arrangement enables making the amount of cooling gas flowing into the first duct sufficiently large and sufficiently cooling the gas supplied to the catalyst part.

The first distribution passage and the second distribution passage may be separated from each other by a partition plate. This arrangement enables preventing the cooling ability from being affected by the occurrence of a disturbance in the flow of the cooling gas and the occurrence of accumulation in the cooling duct.

In the above-described arrangement, a plurality of the cooling ducts may be provided and the plurality of cooling ducts may be disposed at intervals in a direction perpendicular to the intersecting direction. This arrangement enables making the amount of cooling gas flowing into the first duct sufficiently large and sufficiently cooling the gas supplied to the catalyst part.

In the combustion gas cooling apparatus according to the first aspect of the present invention, the cooling duct may be a duct in rectangular parallelepiped form, and the distribution passage may be a passage partitioned by a plurality of partition plates connecting a lower surface and an upper surface of the cooling duct.

In the combustion gas cooling apparatus according to the first aspect of the present invention, an arrangement may be adopted in which the distribution passage is a passage partitioned by a plurality of round tubes forming passages independent of each other. This arrangement enables providing a combustion gas cooling apparatus having a cooling duct having high strength and highly resistant to thermal stress caused by high-temperature combustion gas.

In the combustion gas cooling apparatus according to the first aspect of the present invention, an arrangement may be adopted in which the temperature of the combustion gas flowing in the first duct is equal to or higher than 500° C.

In the combustion gas cooling apparatus according to the first aspect of the present invention, an arrangement may be adopted in which air in atmosphere is used as the cooling gas flowing out from the cooling duct into the first duct.

A denitration apparatus according to a second aspect of the present invention includes the combustion gas cooling apparatus, a second duct through which the mixed gas flows, and a catalyst part provided downstream of the second duct, the catalyst part decomposing nitrogen oxides contained in the mixed gas flowing in from the second duct, and the catalyst part discharging the mixed gas having the nitrogen oxide decomposed, in which the temperature of the mixed gas at the inlet of the catalyst part is not lower than 300° C. and not higher than 500° C.

A combustion gas cooling method according to a third aspect of the present invention is a combustion gas cooling method of cooling a combustion gas by causing a cooling gas to flow out into a first duct through which the combustion gas flows. This method includes a cooling gas inflow step of causing the cooling gas to flow into a cooling gas flow inlet, a distribution step of distributing the cooling gas having flowed into the cooling gas flow inlet to a plurality of cooling gas flow outlets by using a distribution passage, and a cooling gas outflow step of causing the cooling gas distributed in the distribution step to flow into the first duct through the plurality of cooling gas flow outlets and generating a mixed gas in which the combustion gas and the cooling gas are mixed so that a temperature of the mixed gas falls within a predetermined temperature range.

According to the combustion gas cooling method in the third aspect of the present invention, the cooling gas having flowed into the cooling duct is distributed to the plurality of cooling gas flow outlets through the distribution passage to flow out through the cooling gas flow outlets. Therefore the cooling gas is suitably mixed with the combustion gas. Cooling by making sufficiently uniform the temperature distribution in a gas supplied to a catalyst part in which nitrogen oxides are decomposed is thus enabled.

A combustion gas cooling apparatus according to a fourth aspect of the present invention includes a first duct through which a combustion gas flows, a cooling duct from which a cooling gas at a temperature lower than the temperature of the combustion gas flows out into the first duct to form a mixed gas in which the combustion gas and the cooling gas are mixed, and a protective part having a protective surface for protecting at least an upstream-side outer wall surface of the cooling duct at a position on the upstream side in the direction of flow of the combustion gas, the protective part protecting the cooling duct from heat from the combustion gas with a thermal insulating space formed between the upstream-side outer wall surface and the protective surface.

The combustion gas cooling apparatus according to the fourth aspect of the present invention has the first duct through which a combustion gas flows and the cooling duct from which a cooling gas at a temperature lower than the temperature of the combustion gas flows out into the first duct to form a mixed gas in which the combustion gas and the cooling gas are mixed. Therefore the cooling gas having flowed out from the cooling duct is mixed with the combustion gas to cool the combustion gas. The combustion gas cooling apparatus according to the present invention also has the protective part having a protective surface for protecting at least an upstream-side outer wall surface of the cooling duct at a position on the upstream side in the direction of flow of the combustion gas. The protective part protects the cooling duct from heat from the combustion gas with a thermal insulating space formed between the upstream-side outer wall surface and the protective surface. Therefore the upstream-side outer wall surface at the position on the upstream side in the flow direction, which can be affected most easily by heat from the combustion gas, is suitably protected from heat from the combustion gas.

In the combustion gas cooling apparatus according to the fourth aspect of the present invention, an arrangement may be adopted in which a thermal insulating gas is caused to flow through the thermal insulating space formed between the upstream-side outer wall surface and the protective surface.

In the combustion gas cooling apparatus according to the fourth aspect of the present invention, an arrangement may be adopted in which the cooling duct includes a cooling gas flow inlet into which the cooling gas flows in a direction intersecting the direction of flow of the combustion gas, and a cooling gas flow outlet through which the cooling gas having flowed into the cooling gas flow inlet flows out into the first duct along the direction of flow of the combustion gas, and in which the protective part includes a thermal insulating gas flow inlet into which the thermal insulating gas flows along the intersecting direction, and a thermal insulating gas flow outlet through which the thermal insulating gas having passed through the thermal insulating space along the intersecting direction flows out into the first duct along the direction of flow of the combustion gas.

In the combustion gas cooling apparatus thus arranged, the cooling gas flows into the cooling duct in a direction intersecting the combustion gas flow direction and the thermal insulating gas passes through the thermal insulating space in the same direction. Therefore the upstream-side outer wall surface of the cooling duct can be sufficiently protected from heat from the combustion gas. Furthermore the thermal insulating gas having passed through the thermal insulating space flows out into the first duct along the direction of flow of the combustion gas and thereby the thermal insulating gas and the combustion gas are mixed to cool the combustion gas.

In the combustion gas cooling apparatus according to the fourth aspect of the present invention, an arrangement may be adopted in which the protective surface has a sectional shape projecting in an upstream direction with respect to the direction of flow of the combustion gas. This arrangement enables reducing the influence on the protective surface of the pressure of the combustion gas colliding against the protective surface.

In the combustion gas cooling apparatus according to the fourth aspect of the present invention, an arrangement may be adopted in which the cooling duct is a duct in rectangular parallelepiped form and has two outer wall surfaces substantially perpendicular to the upstream-side outer wall surface, in which the protective part has two connection surfaces connected to the protective surface, the connection surfaces protecting the two outer wall surfaces, and in which the thermal insulating gas is caused to flow through the thermal insulating space formed between the cooling duct and the protective surface and the two connection surfaces to protect the cooling duct from heat from the combustion gas.

This arrangement enables each of the upstream-side outer wall surface of the cooling duct in rectangular parallelepiped form and the two outer wall surfaces substantially perpendicular to the upstream-side outer wall surface to be suitably protected with the thermal insulating gas flowing through the thermal insulating space.

In the combustion gas cooling apparatus according to the fourth aspect of the present invention, an arrangement may be adopted in which the cooling duct includes a first cooling gas flow inlet into which the cooling gas flows in a first direction along the intersecting direction, a first cooling gas flow outlet through which the cooling gas having flowed into the first cooling gas flow inlet flows out into the first duct along the direction of flow of the combustion gas, a second cooling gas flow inlet into which the cooling gas flows along a second direction opposite to the first direction, and a second cooling gas flow outlet through which the cooling gas having flowed into the second cooling gas flow inlet flows out into the first duct along the direction of flow of the combustion gas, and in which the protective part includes a first flow inlet as the thermal insulating gas flow inlet into which the thermal insulating gas flows along the first direction, a first flow outlet as the thermal insulating gas flow outlet through which the thermal insulating gas having passed through a first space as the thermal insulating space along the first direction flows out into the first duct along the direction of flow of the combustion gas, a second flow inlet as the thermal insulating gas flow inlet into which the thermal insulating gas flows along the second direction, and a second flow outlet as the thermal insulating gas flow outlet through which the thermal insulating gas having passed through a second space as the thermal insulating space along the second direction flows out into the first duct along the direction of flow of the combustion gas.

In this arrangement, the cooling gas flows into the cooling duct in the two directions opposite to each other and flows out into the first duct along the direction of flow of the combustion gas. Also, the thermal insulating gas flows into the protective part in the two directions opposite to each other and flows out into the first duct along the direction of flow of the combustion gas. This arrangement enables supply of the cooling gas into the first duct at a sufficiently high flow rate and securing the rate of flow of the thermal insulating gas necessary for protection of the cooling duct.

In the above-described arrangement, the first thermal insulating gas flow outlet and the second thermal insulating gas flow outlet may be disposed in the vicinity of a center of the cooling duct. This arrangement enables the thermal insulating gas to flow out into a region where the combustion gas flows at a higher rate and the temperature of the combustion gas is high to further improve the effect of cooling the combustion gas.

In the combustion gas cooling apparatus according to the fourth aspect of the present invention, an arrangement may be adopted in which the temperature of the combustion gas flowing in the first duct is equal to or higher than 500° C.

In the combustion gas cooling apparatus according to the fourth aspect of the present invention, an arrangement may be adopted in which air in atmosphere is used as the cooling gas flowing out from the cooling duct into the first duct and/or from the thermal insulating space into the first duct.

In a denitration apparatus according to a fifth aspect of the present invention, an arrangement may be adopted that includes the combustion gas cooling apparatus in the first aspect of the present invention, a second duct through which the mixed gas flows, and a catalyst part provided downstream of the second duct, the catalyst part decomposing nitrogen oxides contained in the mixed gas flowing in from the second duct, the catalyst part discharging the mixed gas having the nitrogen oxide decomposed, and in which the temperature of the mixed gas at the inlet of the catalyst part is not lower than 300° C. and not higher than 500° C. This arrangement enables decomposing nitrogen oxides contained in the cooled combustion gas to prevent the bad influence on the atmospheric environment.

A combustion gas cooling method according to a sixth aspect of the present invention includes a step of causing a combustion gas to flow through a first duct, a step of causing a cooling gas at a temperature lower than that of the combustion gas to flow out into the first duct through a cooling duct for flowing out the cooling gas to form a mixed gas in which the combustion gas and the cooling gas are mixed, and a protection step of protecting the cooling duct from heat from the combustion gas by causing a thermal insulating gas to flow through a thermal insulating space formed between a protective surface for protecting at least an upstream-side outer wall surface of the cooling duct at a position on the upstream side in the direction of flow of the combustion gas and the upstream-side outer wall surface.

The combustion gas cooling method according to the sixth aspect of the present invention has a step of causing a combustion gas to flow through a first duct and a step of causing a cooling gas at a temperature lower than that of the combustion gas to flow out into the first duct through a cooling duct for flowing out the cooling gas to form a mixed gas in which the combustion gas and the cooling gas are mixed. Therefore the cooling gas having flowed out from the cooling duct is mixed with the combustion gas to cool the combustion gas. The combustion gas cooling method according to the fifth aspect of the present invention also has a protection step of protecting the cooling duct from heat from the combustion gas by causing a thermal insulating gas to flow through a thermal insulating space formed between a protective surface for protecting at least an upstream-side outer wall surface of the cooling duct at a position on the upstream side in the direction of flow of the combustion gas and the upstream-side outer wall surface. As a result, the upstream-side outer wall surface at a position on the upstream side in the flow direction, which can be most easily affected by heat from the combustion gas, can be suitably protected from heat from the combustion gas.

Advantageous Effects of Invention

The present invention enables providing a combustion gas cooling apparatus, a denitration apparatus having the combustion gas cooling apparatus and a combustion gas cooling method that enable cooling by making sufficiently uniform the temperature distribution in a gas supplied to a catalyst part in which nitrogen oxides are decomposed.

The present invention also enables providing a combustion gas cooling apparatus, a combustion gas cooling method that are capable of suitably protecting from the heat in a combustion gas a cooling duct from which a cooling gas at a temperature lower than that of the combustion gas flows out, and with which a mixed gas in which the combustion gas and a cooling gas are mixed is formed.

DESCRIPTION OF EMBODIMENTS

First Embodiment

Figure 1:
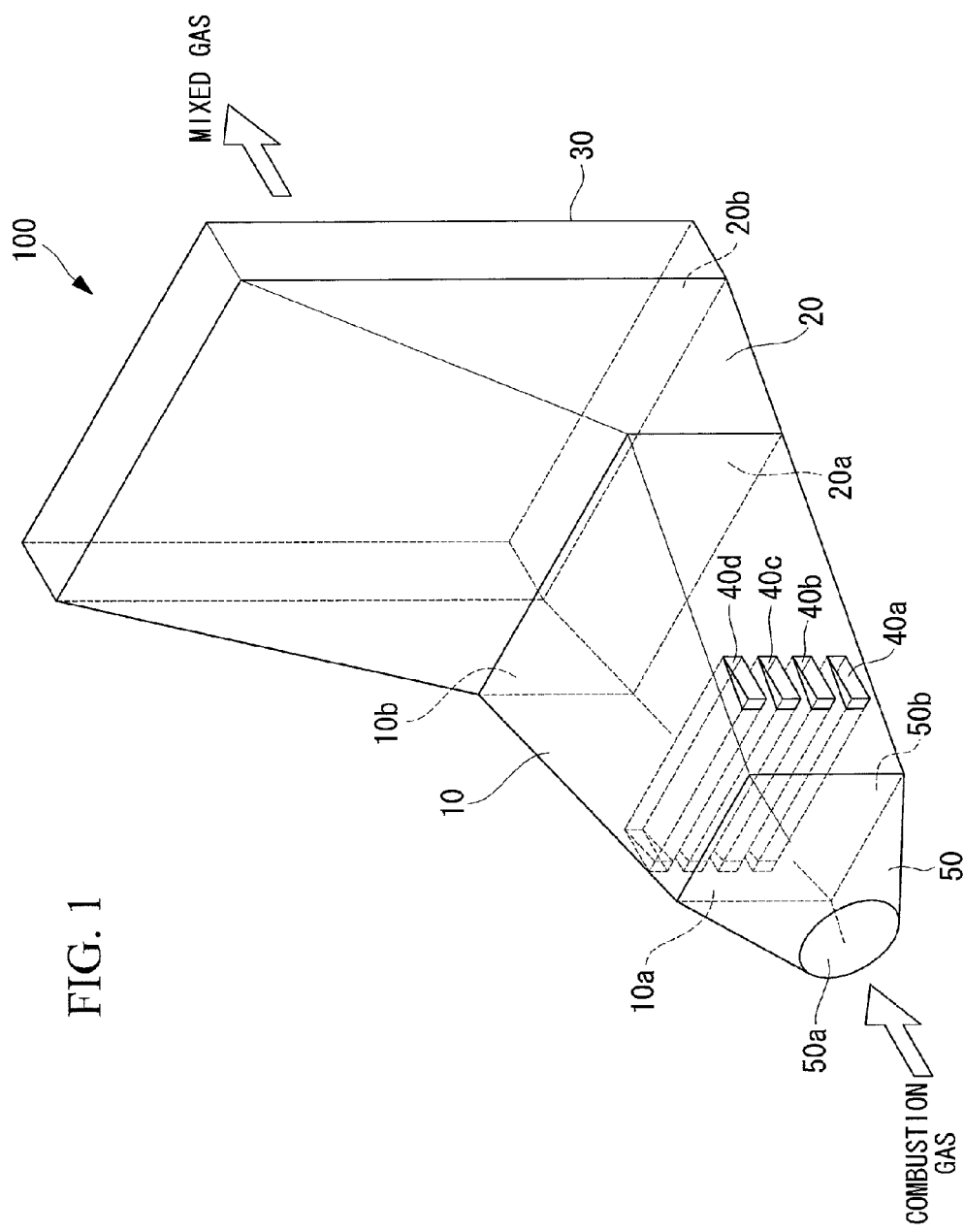
FIG. 1 is a perspective view of a combustion gas cooling apparatus in a first embodiment.
Figure 2:
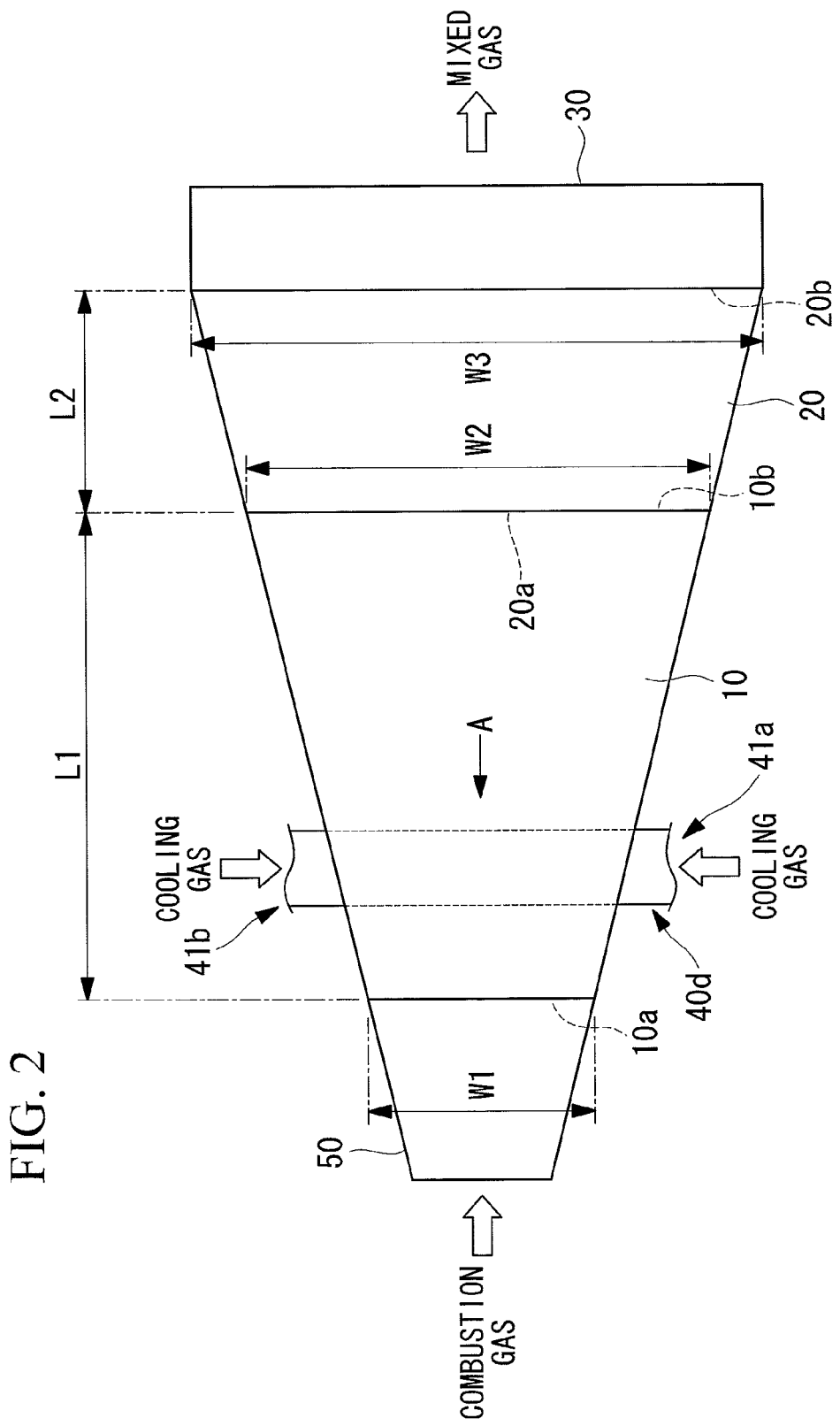
FIG. 2 is a plan view of the combustion gas cooling apparatus in the first embodiment seen from above.
Figure 13:
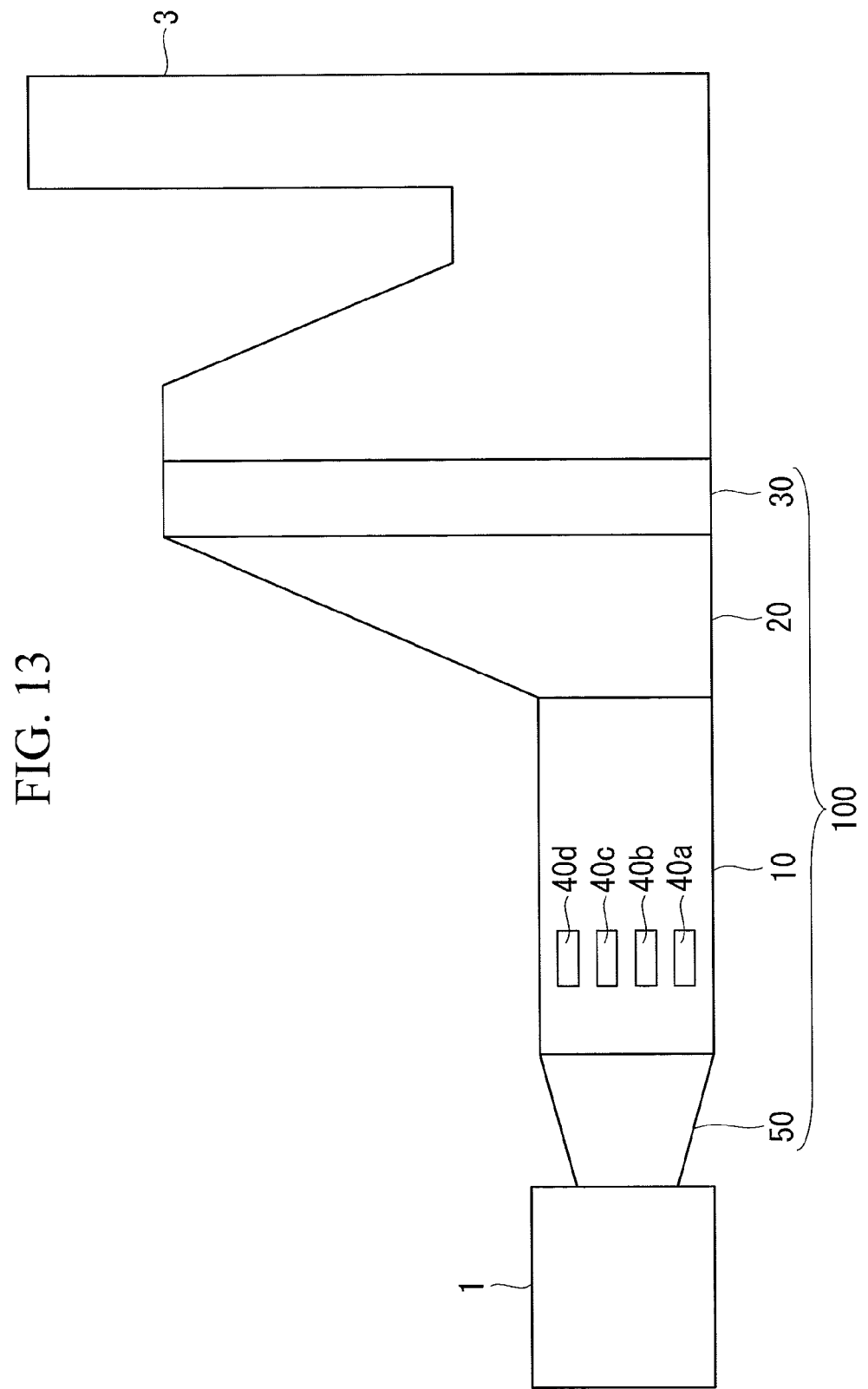
FIG. 13 is a side view of a gas turbine system including the combustion gas cooling apparatus in the first embodiment.

A combustion gas cooling apparatus in a first embodiment will be described with reference to FIGS. 1, 2, and 13. FIG. 1 is a perspective view of a combustion gas cooling apparatus 100 in the first embodiment. FIG. 2 is a plan view of the combustion gas cooling apparatus 100 seen from above. FIG. 13 is a side view of a gas turbine system including the combustion gas cooling apparatus 100. Components indicated by the same reference character in FIGS. 1, 2, and 13 are one and the same component. Arrows in FIGS. 1 and 2 indicate the direction of flow of gas (combustion gas, mixed gas).

The combustion gas cooling apparatus 100 in the first embodiment is an apparatus that allows a combustion gas (exhaust gas) at a high temperature of 550° C. or higher generated by combustion in a gas turbine 1, for example, to flow in through an inlet duct 50, mixes the combustion gas and a cooling gas with each other in a mixing duct 10 to form a mixed gas, and causes the mixed gas passing through an expanded duct 20 to flow into a catalyst part 30, as shown in FIG. 13. The catalyst part 30 decomposes nitrogen oxides contained in the mixed gas and discharges the mixture gas having the nitrogen oxides decomposed to the outside (in the atmosphere) of the gas turbine system including the combustion gas cooling apparatus 100 through a funnel 3 provided on the downstream side. It is preferable to perform cooling in the combustion gas cooling apparatus 100 until a temperature not lower than 300° C. and not higher than 500° C., i.e., a temperature at which the activity of a catalyst is high, and which is suitable for decomposing nitrogen oxides contained in the mixed gas, is reached in the catalyticcatalyst part 30. It is preferable to restrict the distribution of temperature in the mixed gas so that the difference between the highest temperature and the lowest temperature is within a range of 10° C. or less in order to uniformize the temperature of the mixed gas supplied to the catalyticcatalyst part 30.

The inlet duct 50 is formed of a metallic material or any heat resistant material such as iron, and functions as a passage for flowing of the combustion gas. The inlet duct 50 has a flow inlet 50a into which the combustion gas discharged from the gas turbine flows, and a flow outlet 50b through which the combustion gas having flowed into the flow inlet 50a flows out. The flow inlet 50a is, for example, generally circular as viewed in a section taken along a direction perpendicular to the direction of inflow of the combustion gas (the direction of the arrow in FIG. 1). On the other hand, the flow outlet 50b is, for example, generally square as viewed in a section taken along a direction perpendicular to the direction of inflow of the combustion gas (the direction of the arrow in FIG. 1). The inlet duct 50 has such a shape that the sectional area along a direction perpendicular to the direction of inflow of the combustion gas (the direction of the arrow in FIG. 1) is gradually increased from the flow inlet 50a toward the flow outlet 50b. For example, the rate of flow in the inlet duct 50 of the combustion gas discharged from the gas turbine is 50 m/s to 100 m/s.

The mixing duct (first duct) 10 is formed of a metallic material or any heat resistant material such as iron, and functions as a passage for flow of the mixed gas in which the combustion gas and the cooling gas are mixed. The mixing duct 10 has a flow inlet (first flow inlet) 10a to which the combustion gas discharged from the flow outlet 50b of the inlet duct 50 flows, and a flow outlet (first flow outlet) 10b through which the combustion gas having flowed into the flow inlet 10a flows out. The flow inlet 10a is, for example, square as viewed in a section taken along a direction perpendicular to the direction of inflow of the combustion gas (the direction of the arrow in FIG. 1). The flow outlet 10b has, for example, a rectangular shape larger in width than in height as viewed in a section taken along a direction perpendicular to the direction of inflow of the combustion gas (the direction of the arrow in FIG. 1). The flow inlet 10a of the mixing duct 10 has the same shape as that of the flow outlet 50b of the inlet duct 50. These are connected so that no leakage of the combustion gas occurs. The sectional shapes of the flow inlet 10a and the flow outlet 10b are not limited to the square and rectangular shapes. They may alternatively be elliptical or circular, for example.

A cooling duct 40 is formed of a metallic material or any heat resistant material such as iron. The coolantcooling gas at a temperature lower than that of combustion gas is caused to flow out from the cooling duct 40 into the mixing duct 10, thereby forming the mixed gas in which the combustion gas and the coolantcooling gas are mixed. In the first embodiment, four cooling ducts (40a, 40b, 40c, and 40d in order from below), for example, are disposed at intervals in the height direction of the mixing duct 10 (third direction). The disposition with spacing in the height direction of the mixing duct 10 in the present embodiment is not exclusively adopted. Cooling ducts may be disposed in a direction intersecting the direction of flow of the combustion gas, e.g., the width direction of the mixing duct at intervals in this direction. Any of various gasses at a temperature lower than that of the combustion gas can be used as cooling gas. In the first embodiment, air in the atmosphere is used as cooling gas. Description will be made with reference character 40 in the case of not discriminating the four cooling ducts from each other, and with one of reference characters 40a, 40b, 40c, and 40d in the case of discriminating each cooling duct from the others.

As shown in FIGS. 1 and 2, the cooling duct 40 in rectangular parallelepiped form has cooling gas flow inlets 41a and 41b in two directions substantially perpendicular to the direction of flow of the combustion gas (the direction of the arrow indicated at the bottom of FIG. 2), and the cooling gas flows in through the two cooling gas flow inlets 41a and 41b. The two cooling gas flow inlets are respectively connected to coupling ducts (not shown in the figures) each having an air fan (not shown in the figures) provided in the passage, which is not shown in FIGS. 1 and 2. By the power of drives such as motors, the air fans cause air in the atmosphere to flow into the coupling ducts so that the air functioning as cooling gas is led to the cooling gas flow inlets 41a and 41b through the coupling ducts. The cooling duct 40 in rectangular parallelepiped form in the present embodiment is not exclusively used. For example, a trapezoidal duct or the like may alternatively be used.

The expanded duct (second duct) 20 will be described. The expanded duct 20 is formed of a metallic material or any heat resistant material such as iron, and functions as a passage for flow of the mixed gas in which the combustion gas and the cooling gas are mixed. The expanded duct 20 has a flow inlet (second flow inlet) 20a into which the combustion gas discharged from the flow outlet 10b of the mixing duct 10 flows, and a flow outlet (second flow outlet) 20b through which the combustion gas having flowed into the flow inlet 20a flows out. The flow inlet 20a has, for example, a rectangular shape larger in width than in height as viewed in a section taken along a direction substantially perpendicular to the direction of inflow of the combustion gas (the direction of the arrow in FIG. 1). The flow outlet 20b has, for example, a rectangular shape larger in height than in width as viewed in a section taken along a direction substantially perpendicular to the direction of inflow of the combustion gas (the direction of the arrow in FIG. 1). The flow inlet 20a of the expanded duct 20 has the same shape as that of the flow outlet 10b of the mixing duct 10. These are connected so that no leakage of the mixed gas occurs. The sectional shapes of the flow inlet 20a and the flow outlet 20b are not limited to square and rectangular shapes. They may alternatively be elliptical or circular, for example.

The catalyst part 30 decomposes nitrogen oxides contained in the mixed gas and discharges the mixed gas having the nitrogen oxides decomposed to the outside (in the atmosphere) of the combustion gas cooling apparatus 100. In the expanded duct 20, a blow-in part (not shown in the figures) from which a reducing agent for causing reducing reaction of the mixed gas passing through the catalyst part 30 is blown into the expanded duct 20 is disposed. The blow-in part has a passage, for example, in the form of a round tube having a plurality of holes. Ammonia passing through the passage is blown into the interior of the expanded duct 20 through the plurality of holes. Note that the ammonia is a typical example of a reducing agent; other kinds of reducing agents can also be employed. The mixed gas having the reducing agent blown thereinto by the blow-in part flows into the catalyticcatalyst part 30 through the flow outlet 20b of the expanded duct 20.

The catalyst part 30 functions as a denitration apparatus for decomposing, into water and nitrogen, nitrogen oxides contained in the combustion gas into which the reducing agent is blown by the blow-in part. It is assumed that a selective catalyst reduction (SCR) method of decomposing nitrogen oxides by using ammonia as a reducing agent is used in the first embodiment.

As in the case of the mixing duct 10 or the expanded duct 20, the catalyst part 30 is formed of a metallic material or any heat resistant material such as iron and functions as a passage for flow of the mixed gas in which the combustion gas and the cooling gas are mixed. The catalyst part 30 differs from the mixing duct 10 and the expanded duct 20 in that a plurality of catalyst packs (not shown in the figures) are disposed in the passage by being stacked. Each catalyst pack is a catalyst member filled with a catalyst for decomposing nitrogen oxides (nitrogen monoxide, nitrogen dioxide and so on) in the exhaust gas into water and nitrogen by causing the mixed gas to react with ammonia. The catalyst pack is formed by a lattice or a plate of the catalyst, such that the mixed gas can pass through the interior of the catalyst pack. The catalyst has $TiO_2$ as its main component and vanadium and tungsten added as active components.

The temperature at which the catalyst promotes the reaction by which the mixed gas is decomposed into nitrogen and water is preferably not lower than 300° C. and not higher than 500° C., more preferably not lower than 300° C. and not higher than 470° C. In a low-temperature range below 300° C., the activity of the catalyst is low and a larger amount of the catalyst is required for improving the denitration performance. On the other hand, at a temperature higher than 470° C., a problem arises that ammonia ($NH_3$) is oxidized; the amount of ammonia ($NH_3$) is reduced with oxidation of ammonia; and the denitration performance is reduced. A temperature higher than 500° C. is not only unsuitable for the reducing reaction but also higher than the upper temperature limit for the catalyst. At such a high temperature, there is a possibility of the catalyst being damaged. Therefore the temperature of the mixed gas supplied to the catalyst is preferably not higher than 500° C., more preferably not lower than 300° C. and not higher than 470° C.

The constructions and functions of the mixing duct 10, the expanded duct 20, the catalyst part 30, the cooling duct 40 and the inlet duct 50 constituting the combustion gas cooling apparatus 100 in the first embodiment have been described. The shape of the cooling duct 40, which is important for cooling the combustion gas flowing into the catalyst part 30 by making the temperature distribution in the combustion gas sufficiently uniform, will next be described with reference to FIGS. 3 to 7.

Figure 3:
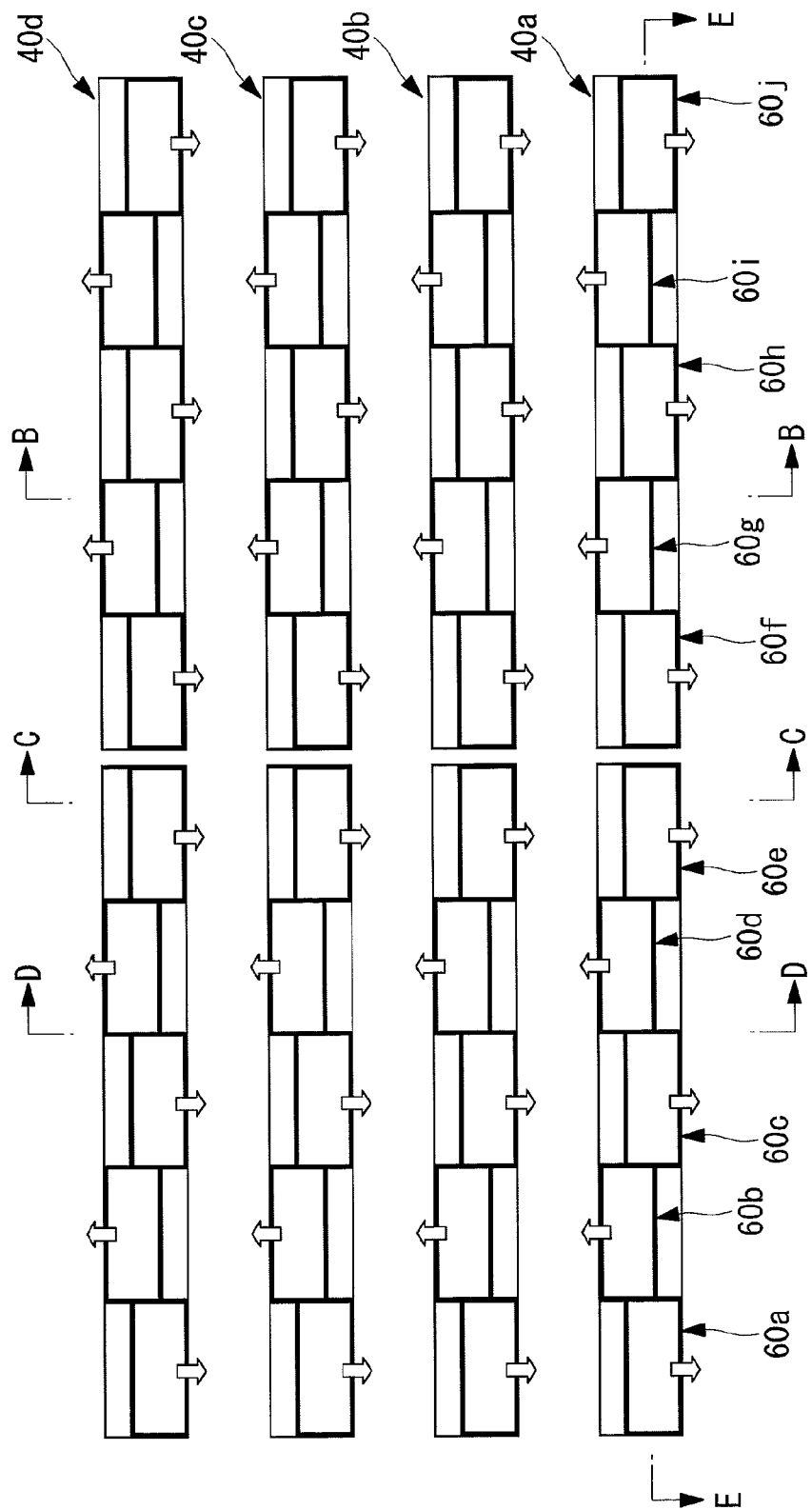
FIG. 3 is a front view of cooling ducts seen in the direction of arrow A in FIG. 2.

FIG. 3 is a front view of the cooling duct 40 seen in the direction of arrow A in FIG. 2. As shown in FIG. 3, the four cooling ducts 40a, 40b, 40c, and 40d are disposed at constant intervals in the height direction of the mixing duct 10. Each cooling duct 40 is fixed on side wall surfaces of the mixing duct 10 with bolts or the like. Note that, the cooling ducts 40a, 40b, 40c, and 40d need not be disposed at constant intervals in the height direction, but may disposed at variable intervals.

In each cooling duct 40, cooling gas outflow apertures 60 in ten places, for example, are provided at different positions in the longitudinal direction of the cooling duct 40 (in the width direction of the mixing duct 10). Description will be made below of the cooling duct 40a. In the cooling duct 40a, cooling gas outflow apertures 60a to 60j in ten places are provided at different positions in the longitudinal direction of the cooling duct 40a. Six cooling gas outflow apertures 60a, 60c, 60e, 60f, 60h, and 60j (first cooling gas flow outlets) in the cooling gas outflow apertures in the ten places are open downward along the vertical direction (the height direction of the mixing duct 10). On the other hand, four cooling gas outflow apertures 60b, 60d, 60g, and 60i (second cooling gas flow outlets) are open upward along the vertical direction (the height direction of the mixing duct 10). That is, the plurality of cooling gas outflow apertures 60a to 60j include cooling gas outflow apertures open in different directions. The cooling gas outflow apertures open downward along the vertical direction (the height direction of the mixing duct 10) and the cooling gas outflow apertures open upward along the vertical direction (the height direction of the mixing duct 10) are alternately disposed along a direction substantially perpendicular to (intersecting) the direction of flow of the combustion gas. As a result of this disposition, mixing of the cooling gas and the combustion gas is promoted and the temperature distribution in the gas supplied to the catalyst part 30 can be made more uniform. Note that, the number of cooling gas outflow apertures which are open upward along the height direction of the mixing duct 10 is not limited to four; the number of cooling gas outflow apertures which are open downward along the height direction of the mixing duct 10 is not limited to six.

From the cooling gas outflow apertures open downward along the vertical direction (the height direction of the mixing duct 10), the cooling gas flows out downward along the vertical direction, as indicated by arrows in FIG. 3. On the other hand, from the coolantcooling gas outflow apertures open upward along the vertical direction (the height direction of the mixing duct 10), the cooling gas flows out upward along the vertical direction.

Figure 4:
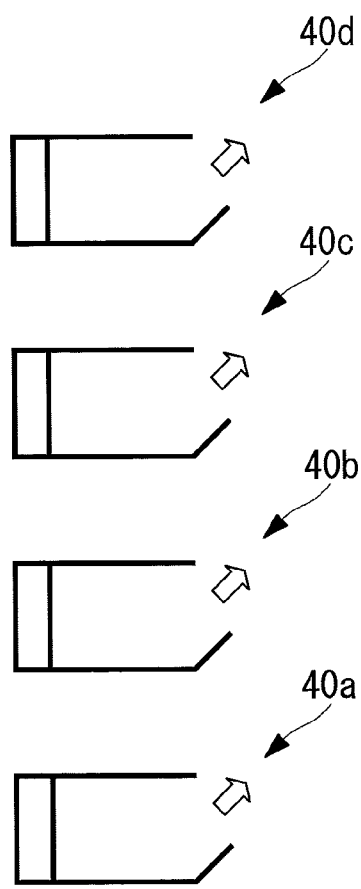
FIG. 4 is a B-B sectional view of the cooling ducts shown in FIG. 3.
Figure 5:
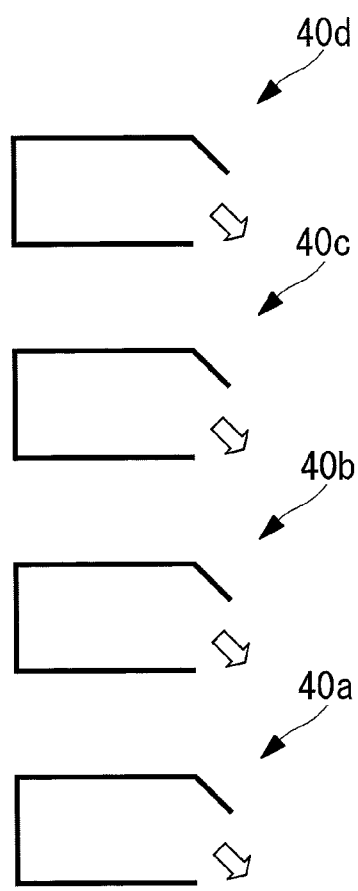
FIG. 5 is a C-C sectional view of the cooling ducts shown in FIG. 3.
Figure 6:
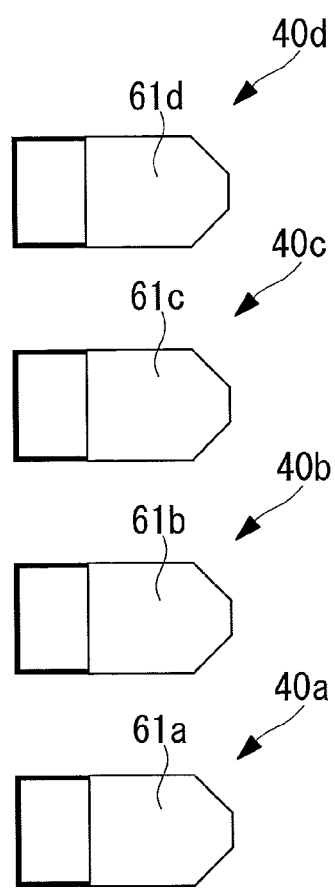
FIG. 6 is a D-D sectional view of the cooling ducts shown in FIG. 3.
Figure 7:
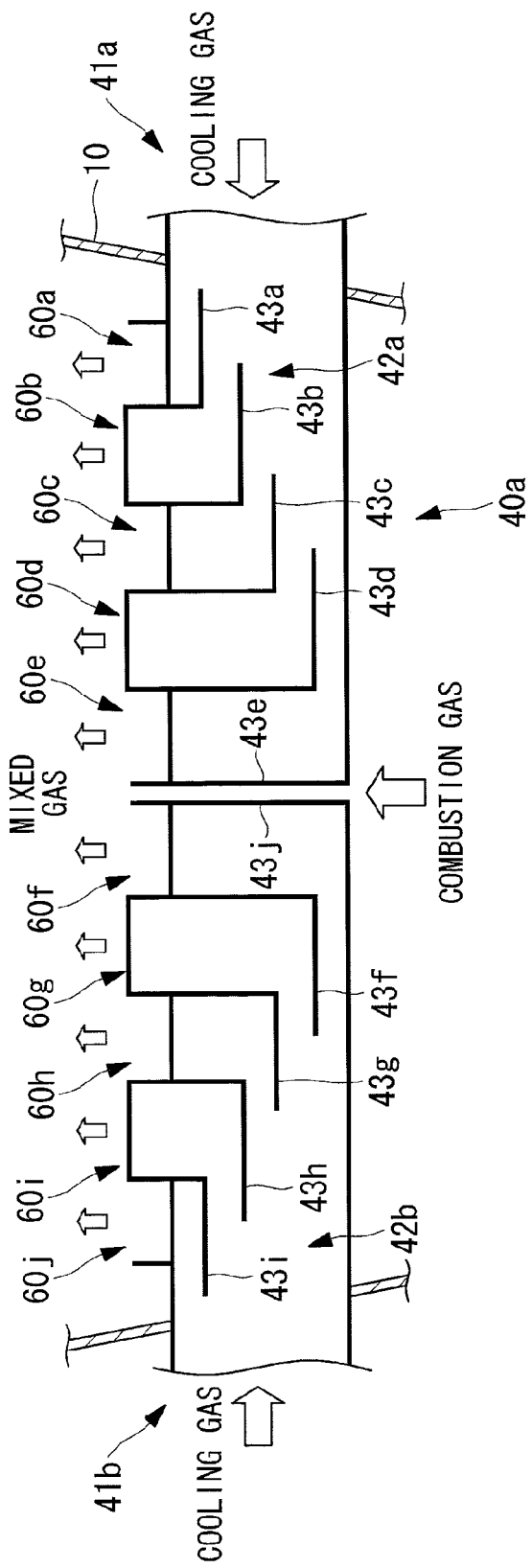
FIG. 7 is an E-E sectional view of the cooling ducts shown in FIG. 3.

FIG. 4 is a B-B sectional view of the cooling ducts 40 shown in FIG. 3. FIG. 5 is a C-C sectional view of the cooling ducts 40 shown in FIG. 3. FIG. 6 is a D-D sectional view of the cooling ducts 40 shown in FIG. 3. FIG. 7 is an E-E sectional view of the cooling duct 40 shown in FIG. 3.

As shown in FIG. 4, from each cooling gas outflow aperture open upward along the vertical direction (the height direction of the mixing duct 10), the coolantcooling gas flows out obliquely upward along the vertical direction. This coolantcooling gas flowing out has a velocity component upward along the vertical direction (the height direction of the mixing duct 10) and a velocity component along the direction of flow of the combustion gas (the rightward direction in FIG. 4).

Also, as shown in FIG. 5, from each cooling gas outflow aperture open downward along the vertical direction (the height direction of the mixing duct 10), the cooling gas flows out obliquely downward along the vertical direction. This cooling gas flowing out has a velocity component downward along the vertical direction (the height direction of the mixing duct 10) and a velocity component along the direction of flow of the combustion gas (the rightward direction in FIG. 5).

As shown in FIG. 6, partition plates (61a to 61d) are disposed between the coolantcooling gas outflow apertures open upward along the vertical direction (the height direction of the mixing duct 10) and the coolantcooling gas outflow apertures open downward along the vertical direction (the height direction of the mixing duct 10). The partition plates (61a to 61d) separate the cooling gas flow in the cooling ducts (40a to 40d) to allow more even distribution of the cooling gas between the outflow apertures.

The cooling gas flow inlets (41a and 41b), the plurality of cooling gas outflow apertures (60a to 60j) and distribution passages (42a and 42b) provided in the cooling duct 40a will next be described with reference to FIG. 7. While the cooling duct 40a is described below, the other cooling ducts (40b, 40c, and 40d) are not described because the other cooling ducts have the same construction as that of the cooling duct 40a.

FIG. 7 is an E-E sectional view of the cooling duct 40a shown in FIG. 3. In the cooling duct 40a shown in FIG. 7, the combustion gas flows upward from below into the mixing duct 10 as viewed in the figure. The cooling duct 40a has the coolantcooling gas flow inlets 41a and 41b in two directions substantially perpendicular to the direction of flow of the combustion gas. Through the two coolantcooling gas flow inlets 41a and 41b, the cooling gas flows in along directions substantially perpendicular to (intersecting) the direction of flow of the combustion gas. Also, in the cooling duct 40a, the plurality of cooling gas outflow apertures (60a to 60j) are disposed at different positions in a direction substantially perpendicular to (intersecting) the direction of flow of the combustion gas.

From the cooling gas flow inlet (first cooling gas flow inlet) 41a disposed on the right-hand side as viewed in FIG. 7, the cooling gas flows in along a right-to-left direction (first direction) as viewed in FIG. 7. The cooling gas having flowed into the cooling duct 40a through the cooling gas flow inlet 41a flows into the distribution passage (first distribution passage) 42a. The distribution passage 42a is a passage through which the cooling gas having flowed into the cooling gas flow inlet 41a is distributed to the plurality of cooling gas outflow apertures (60a to 60e).

The distribution passage 42a has, for example, partition plates 43a, 43b, 43c, and 43d. Each of the partition plates 43a to 43d is a member in plate form formed of a metallic material or any heat resistant material such as iron and disposed substantially perpendicularly from a lower wall surface (lower surface) to an upper wall surface (upper surface) in the cooling duct 40a. An upper portion of each of the partition plates 43a to 43d is joined by welding to the upper wall surface in the cooling duct 40a, while a lower portion of each of the partition plates 43a to 43d is joined by welding to the lower wall surface in the cooling duct 40a. The coolantcooling gas cannot leak out through the joints therebetween.

As shown in FIG. 7, each of the partition plates 43a to 43d has a portion substantially parallel to the direction of flow of the cooling gas (the right-to-left direction in FIG. 7) and a portion substantially parallel to a direction (a top-bottom direction in FIG. 7) substantially perpendicular to the direction of flow of the cooling gas. The cooling gas having flowed into the cooling gas flow inlet 41a is distributed into five branch passages by the partition plates 43a to 43d. The cooling gas is distributed to the cooling gas outflow apertures 60a, 60b, 60c, 60d, and 60e by being distributed into the five branch passages. The cooling gas flows out through the cooling gas outflow apertures at flow rates as controlled by the partition plates.

The cooling gas having flowed into the branch passage partitioned by the partition plate 43a and an inner wall surface of the cooling duct 40 is led to the cooling gas outflow aperture 60a to flow out along the direction of flow of the combustion gas (a bottom-to-top direction in FIG. 7). The cooling gas having flowed into the branch passage partitioned by the partition plate 43a and the partition plate 43b is led to the cooling gas outflow aperture 60b to flow out along the direction of flow of the combustion gas (a bottom-to-top direction in FIG. 7). The cooling gas having flowed into the branch passage partitioned by the partition plate 43b and the partition plate 43c is led to the cooling gas outflow aperture 60c to flow out along the direction of flow of the combustion gas (a bottom-to-top direction in FIG. 7). The cooling gas having flowed into the branch passage partitioned by the partition plate 43c and the partition plate 43d is led to the cooling gas outflow aperture 60d to flow out along the direction of flow of the combustion gas (a bottom-to-top direction in FIG. 7). The cooling gas having flowed into the branch passage partitioned by the partition plate 43d and an inner wall surface of the cooling duct 40 is led to the cooling gas outflow aperture 60e to flow out along the direction of flow of the combustion gas (a bottom-to-top direction in FIG. 7).

From the cooling gas flow inlet (second cooling gas flow inlet) 41b disposed on the left-hand side as viewed in FIG. 7, the cooling gas flows in along a left-to-right direction (second direction) as viewed in FIG. 7. The cooling gas having flowed into the cooling duct 40a through the cooling gas flow inlet 41b flows into the distribution passage (second distribution passage) 42b. The distribution passage 42b is a passage through which the cooling gas having flowed into the cooling gas flow inlet 41b is distributed to the plurality of cooling gas outflow apertures (60f to 60j).

The distribution passage 42b has, for example, partition plates 43f, 43g, 43h, and 43i. Each of the partition plates 43f to 43i is a member in plate form formed of a metallic material or any heat resistant material such as iron and disposed substantially perpendicularly from a lower wall surface (lower surface) to an upper wall surface (upper surface) in the cooling duct 40a. An upper portion of each of the partition plates 43f to 43i is joined by welding to the upper wall surface in the cooling duct 40a, while a lower portion of each of the partition plates 43f to 43i is joined by welding to the lower wall surface in the cooling duct 40a. The cooling gas cannot leak out through the joints therebetween.

As shown in FIG. 7, each of the partition plates 43f to 43i has a portion substantially parallel to the direction of flow of the cooling gas (the left-to-right direction in FIG. 7) and a portion substantially parallel to a direction (a top-bottom direction in FIG. 7) substantially perpendicular to the direction of flow of the cooling gas. The cooling gas having flowed into the cooling gas flow inlet 41b is distributed into five branch passages by the partition plates 43f to 43i. The cooling gas is distributed to the cooling gas outflow apertures 60f, 60g, 60h, 60i, and 60j by being distributed into the five branch passages. The cooling gas flows out from the cooling gas outflow apertures at flow rates as controlled by the partition plates.

The cooling gas having flowed into the branch passage partitioned by the partition plate 43f and an inner wall surface of the cooling duct 40 is led to the cooling gas outflow aperture 60f to flow out along the direction of flow of the combustion gas (a bottom-to-top direction in FIG. 7). The cooling gas having flowed into the branch passage partitioned by the partition plate 43f and the partition plate 43g is led to the cooling gas outflow aperture 60g to flow out along the direction of flow of the combustion gas (a bottom-to-top direction in FIG. 7). The cooling gas having flowed into the branch passage partitioned by the partition plate 43g and the partition plate 43h is led to the cooling gas outflow aperture 60h to flow out along the direction of flow of the combustion gas (a bottom-to-top direction in FIG. 7). The cooling gas having flowed into the branch passage partitioned by the partition plate 43h and the partition plate 43i is led to the cooling gas outflow aperture 60i to flow out along the direction of flow of the combustion gas (a bottom-to-top direction in FIG. 7). The cooling gas having flowed into the branch passage partitioned by the partition plate 43i and an inner wall surface of the cooling duct 40 is led to the cooling gas outflow aperture 60j to flow out along the direction of flow of the combustion gas (a bottom-to-top direction in FIG. 7).

The distribution passage 42a and the distribution passage 42b are separated from each other by partition plates 43e and 43j. Each of the partition plates 43e and 43j is a member in plate form formed of a metallic material or any heat resistant material such as iron and disposed substantially perpendicularly from the lower wall surface (lower surface) to the upper wall surface (upper surface) in the cooling duct 40a. An upper portion of each of the partition plates 43e and 43j is joined by welding to the upper wall surface in the cooling duct 40a, while a lower portion of each of the partition plates 43e and 43j is joined by welding to the lower wall surface in the cooling duct 40a. The coolantcooling gas cannot leak out through the joints therebetween. A gap is provided in advance between the partition plates 43e and 43j by considering thermal elongation of the cooling duct 40 caused by the combustion gas.

As described above, the combustion gas cooling apparatus 100 in the first embodiment has the mixing duct 10 having the flow inlet 10a through which a combustion gas flows and the flow outlet 10b through which the combustion gas having flowed into the flow inlet 10a flows out, the cooling duct 40 from which a cooling gas at a temperature lower than that of the combustion gas flows out into the mixing duct 10 to form a mixed gas in which the combustion gas and the cooling gas are mixed, the expanded duct 20 having the flow inlet 20a into which the mixed gas flowing out from the flow outlet 10b of the mixing duct 10 flows and the flow outlet 20b through which the mixed gas having flowed into the flow inlet 20a flows out, and the catalyst part 30 provided downstream of the expanded duct, the catalyst part 30 decomposing nitrogen oxides contained in the mixed gas flowing out from the flow outlet 20b, the catalyst part 30 discharging the mixed gas having the nitrogen oxides decomposed. The cooling duct 40 has the cooling gas flow inlets 41a and 41b into which the cooling gas flows, the plurality of cooling gas outflow apertures 60a to 60j through which the cooling gas having flowed in through the cooling gas flow inlets 41a and 41b flows out into the mixing duct 10, and the distribution passages 42a and 42b through which the cooling gas having flowed into the cooling gas flow inlets 41a and 41b is distributed to the plurality of cooling gas outflow apertures 60a to 60j.

The cooling gas having flowed into the cooling duct 40 is distributed to the plurality of cooling gas outflow apertures 60a to 60j through the distribution passages 42a and 42b to flow out through the cooling gas outflow apertures 60a to 60j. Therefore the cooling gas is suitably mixed with the combustion gas. Cooling by making sufficiently uniform the temperature distribution in the gas supplied to the catalyst part 30 that decomposes nitrogen oxides is enabled thereby.

In the combustion gas cooling apparatus 100 in the first embodiment, the cooling gas flows into the cooling gas flow inlets 41a and 41b in directions intersecting the direction of flow of the combustion gas, and the plurality of cooling gas outflow apertures 60a to 60j are disposed at different positions in the intersecting direction. This arrangement enables the cooling gas to flow out from the different positions in the direction intersecting the direction of flow of the combustion gas to perform cooling by making sufficiently uniform the temperature distribution in the gas supplied to the catalyst part 30.

In the combustion gas cooling apparatus 100 in the first embodiment, the plurality of cooling gas outflow apertures 60a to 60j include the first coolantcooling gas outflow apertures 60a, 60c, 60e, 60f, 60h, and 60j and the second coolantcooling gas outflow apertures 60b, 60d, 60g, and 60i open in a direction different from the direction in which the first coolantcooling gas outflow apertures are open. This arrangement enables the cooling gas to flow out in different directions and mix with the combustion gas to make more uniform the temperature distribution in the gas supplied to the catalyst part 30.

The first cooling gas outflow apertures 60a, 60c, 60e, 60f, 60h, and 60j and the second cooling gas outflow apertures 60b, 60d, 60g, and 60i are alternately disposed along the intersecting direction. This arrangement enables promoting mixing of the coolantcooling gas and the combustion gas to make more uniform the temperature distribution in the gas supplied to the catalyst part 30.

In the combustion gas cooling apparatus 100 in the first embodiment, the cooling duct 40 has the cooling gas flow inlet 41a into which the cooling gas flows along the first direction corresponding to a direction intersecting the direction of flow of the combustion gas, the cooling gas flow inlet 41b into which the cooling gas flows along the second direction opposite to the first direction, the distribution passage 42a through which the coolantcooling gas having flowed into the cooling gas flow inlet 41a is distributed to the plurality of cooling gas outflow apertures 60a to 60e, and the distribution passage 42b through which the coolantcooling gas having flowed into the cooling gas flow inlet 41b is distributed to the plurality of cooling gas outflow apertures 60g to 60j. This arrangement enables making the amount of cooling gas flowing into the mixing duct 10 sufficiently large to sufficiently cool the gas supplied to the catalyst part 30.

The distribution passage 42a and the distribution passage 42b are separated from each other by the partition plates 43e and 43j. This arrangement enables preventing the cooling ability from being affected by the occurrence of a disturbance in the flow of the cooling gas and the occurrence of accumulation in the cooling duct 40. Since a gap is provided between the partition plates 43e and 43j, the cooling duct 40 itself is not deformed even when thermal elongation of the cooling duct 40 is caused by the combustion gas.

In the combustion gas cooling apparatus 100 in the first embodiment, a plurality of the cooling ducts 40 are provided and are disposed at intervals in the height direction of the mixing duct 10. This arrangement enables making the amount of cooling gas flowing into the mixing duct 10 sufficiently large to sufficiently cool the gas supplied to the catalyst part 30.

In the combustion gas cooling apparatus 100 in the first embodiment, the cooling duct 40 is in rectangular parallelepiped form and the distribution passages 42a and 42b are partitioned by the plurality of partition plates 43a to 43i connecting the bottom surface and the upper surface of the cooling duct 40.

With the combustion gas cooling apparatus 100 in the first embodiment, steps described below are executed to carry out a combustion gas cooling method.

That is, a cooling gas inflow step of causing the cooling gas to flow into the cooling gas flow inlets 41a and 41b, a distribution step of distributing the cooling gas having flowed into the cooling gas flow inlets 41a and 41b to the plurality of cooling gas outflow apertures 60a to 60j by using the distribution passages 42a and 42b and a cooling gas outflow step of causing the cooling gas distributed in the distribution step to flow out into the mixing duct 10 through the plurality of cooling gas outflow apertures 60a to 60j and generating a mixed gas in which the combustion gas and the cooling gas are mixed so that the temperature of the combustion gas becomes 300° C. to 500° C. inclusive are executed.

The first embodiment has been described with respect to an arrangement with which the combustion gas generated by combustion in the gas turbine 1 and having a temperature equal to or higher than 550° C. is cooled to a temperature not lower than 300° C. and not higher than 500° C. However, a satisfactory effect can be obtained even when the temperature of the combustion gas is, for example, in the range from 500 to 550° C. For example, the combustion gas having a temperature of 500° C. is cooled to a temperature not lower than 300° C. and not higher than 470° C. to improve the temperature distribution in the mixed gas so that full use of the performance of the catalyst can be made.

Second Embodiment

A second embodiment of the present invention will be described with reference to FIGS. 8 to 12.

The cooling duct 40 in the first embodiment is a duct in rectangular parallelepiped form. A cooling duct 45 in the second embodiment is a duct formed of round tubes. The second embodiment is a modification of the first embodiment and is generally the same as the first embodiment except for portions particularly described below. Therefore the description for the same portions will not be repeated. The cooling duct 40 in the present embodiment is formed of round tubes. However, the cooling duct 40 in this form is not exclusively used. For example, the cooling duct 40 may be formed of semicircular tubes or the like.

Figure 8:
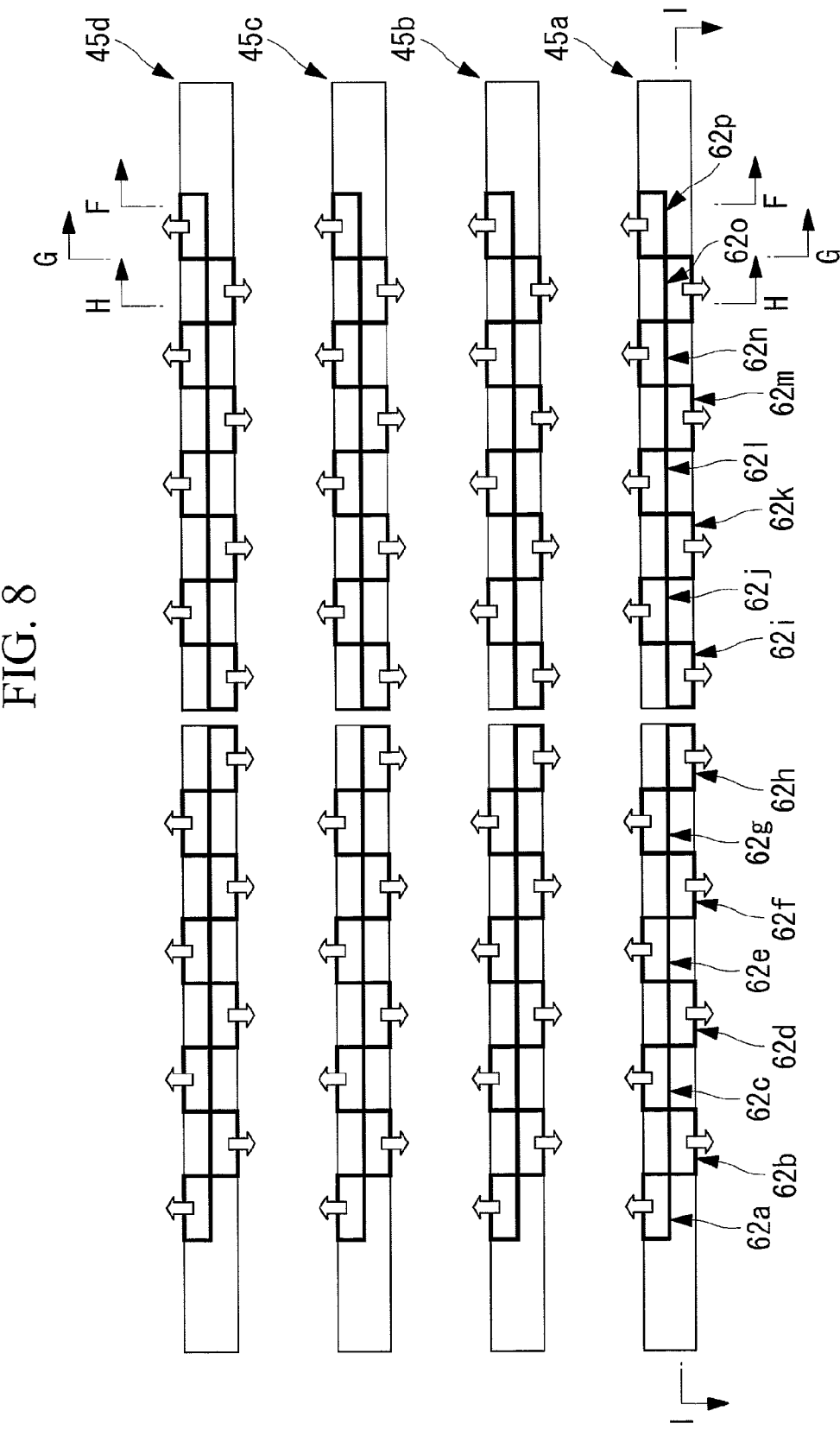
FIG. 8 is a front view of cooling ducts in a second embodiment seen in the direction of arrow A in FIG. 2.

FIG. 8 is a front view of cooling ducts 45 in the second embodiment seen in the direction of arrow A in FIG. 2.

As shown in FIG. 8, four cooling ducts 45a, 45b, 45c, and 45d are disposed at constant intervals in the height direction of the mixing duct 10. Each cooling duct 45 is fixed on side wall surfaces of the mixing duct 10 with bolts or the like. Note that, the cooling ducts 45a, 45b, 45c, and 45d need not be disposed at constant intervals in the height direction, but may disposed at variable intervals.

In each cooling duct 45, cooling gas outflow apertures 62a to 62p in sixteen places, for example, are provided at different positions in the longitudinal direction of the cooling duct 45 (in the width direction of the mixing duct 10). Description will be made below of the cooling duct 45a. In the cooling duct 45a, cooling gas outflow apertures 62a to 62p in sixteen places are provided at different positions in the longitudinal direction of the cooling duct 45a. Eight cooling gas outflow apertures 62b, 62d, 62f, 62h, 62i, 62k, 62m, and 62o (first cooling gas flow outlets) in the sixteen cooling gas outflow apertures are open downward along the vertical direction (the height direction of the mixing duct 10). On the other hand, eight cooling gas outflow apertures 62a, 62c, 62e, 62g, 62j, 62l, 62n, and 62p (second coolant-cooling gas flow outlets) are open upward along the vertical direction (the height direction of the mixing duct 10). That is, the plurality of coolantcooling gas outflow apertures 62a to 62p include cooling gas outflow apertures open in different directions. The cooling gas outflow apertures open downward along the vertical direction (the height direction of the mixing duct 10) and the cooling gas outflow apertures open upward along the vertical direction (the height direction of the mixing duct 10) are alternately disposed along a direction substantially perpendicular to (intersecting) the direction of flow of the combustion gas.

From the cooling gas outflow apertures 62b, 62d, 62f, 62h, 62i, 62k, 62m, and 62o open downward along the vertical direction (the height direction of the mixing duct 10), the cooling gas flows out downward along the vertical direction, as indicated by arrows in FIG. 8. On the other hand, from the cooling gas outflow apertures 62a, 62c, 62e, 62g, 62j, 62l, 62n, and 62p open upward along the vertical direction (the height direction of the mixing duct 10), the cooling gas flows out upward along the vertical direction.

Figure 9:
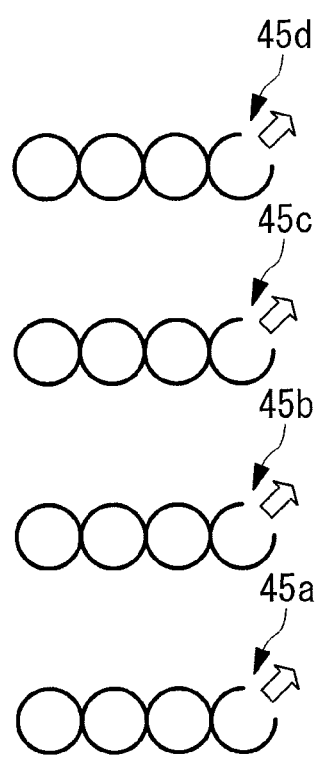
FIG. 9 is an F-F sectional view of the cooling ducts shown in FIG. 8.
Figure 10:
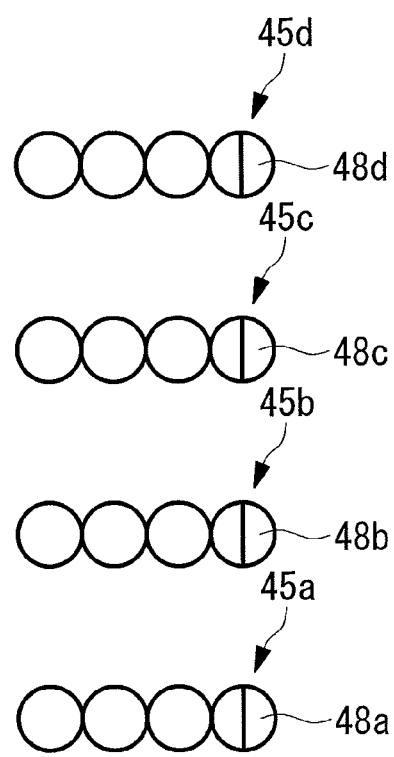
FIG. 10 is a G-G sectional view of the cooling ducts shown in FIG. 8.
Figure 11:
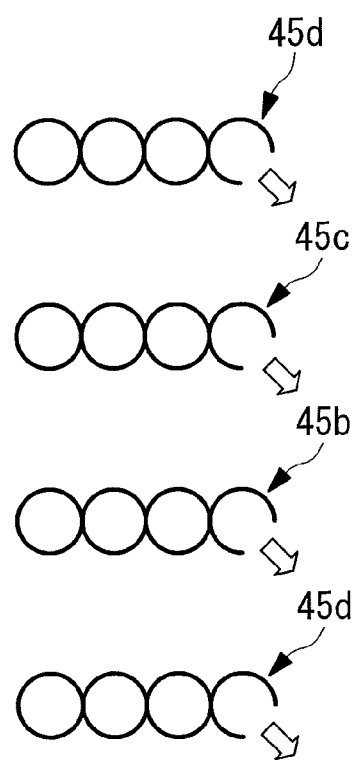
FIG. 11 is an H-H sectional view of the cooling ducts shown in FIG. 8.
Figure 12:
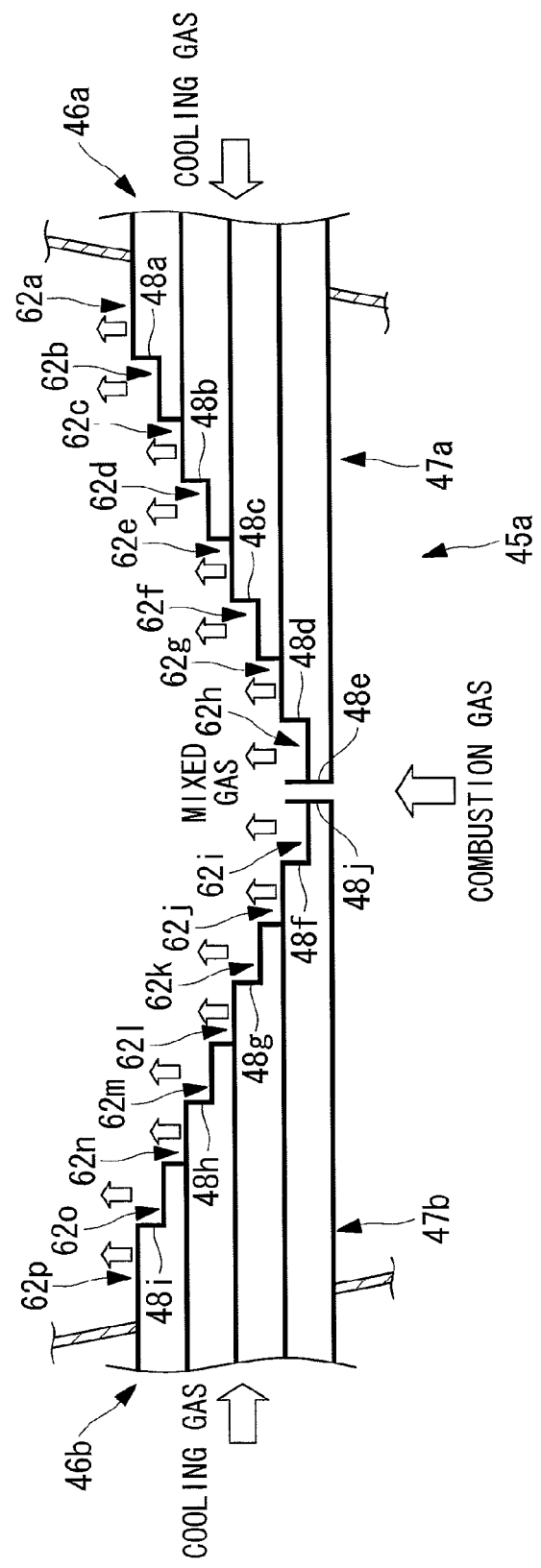
FIG. 12 is an I-I sectional view of the cooling ducts shown in FIG. 8.

FIG. 9 is an F-F sectional view of the cooling ducts 45 shown in FIG. 8. FIG. 10 is a G-G sectional view of the cooling ducts 45 shown in FIG. 8. FIG. 11 is an H-H sectional view of the cooling ducts 45 shown in FIG. 8. FIG. 12 is an I-I sectional view of the cooling duct 45 shown in FIG. 8. As shown in FIGS. 9 to 12, each cooling duct 45 is formed of four round tubes.

As shown in FIG. 9, from each cooling gas outflow aperture open upward along the vertical direction (the height direction of the mixing duct 10), the cooling gas flows out obliquely upward along the vertical direction. This cooling gas flowing out has a velocity component upward along the vertical direction (the height direction of the mixing duct 10) and a velocity component along the direction of flow of the combustion gas (the rightward direction in FIG. 9).

Also, as shown in FIG. 11, from each cooling gas outflow aperture open downward along the vertical direction (the height direction of the mixing duct 10), the cooling gas flows out obliquely downward along the vertical direction. This cooling gas flowing out has a velocity component downward along the vertical direction (the height direction of the mixing duct 10) and a velocity component along the direction of flow of the combustion gas (the rightward direction in FIG. 11).

As shown in FIG. 10, partition plates 48a are disposed between the cooling gas outflow apertures open upward along the vertical direction (the height direction of the mixing duct 10) and the cooling gas outflow apertures open downward along the vertical direction (the height direction of the mixing duct 10). The partition plates separate the flows of the cooling gas flowing out of the adjacent pairs of the cooling gas outflow apertures so that the flows of the cooling gas do not mix with each other in the cooling duct. Also, by the partition plates 48a, the cooling gas is evenly distributed to each adjacent pair of the cooling gas outflow apertures so that the cooling gas flows out at substantially equal rates from the cooling gas outflow apertures.

Cooling gas flow inlets (46a and 46b), the plurality of cooling gas outflow apertures (62a to 62p) and distribution passages (47a and 47b) provided in the cooling duct 45a will next be described with reference to FIG. 12. While the cooling duct 45a is described below, the other cooling ducts (45b, 45c, and 45d) are not described because the other cooling ducts have the same construction as that of the cooling duct 45a.

FIG. 12 is an I-I sectional view of the cooling duct 45a shown in FIG. 8. In the cooling duct 45a shown in FIG. 12, the combustion gas flows upward from below as viewed in the figure. The cooling duct 45a has cooling gas flow inlets 46a and 46b in two directions substantially perpendicular to the direction of flow of the combustion gas. Through the two cooling gas flow inlets 46a and 46b, the cooling gas flows in along directions substantially perpendicular to (intersecting) the direction of flow of the combustion gas. Also, in the cooling duct 45a, the plurality of cooling gas outflow apertures (62a to 62p) are disposed at different positions in a direction substantially perpendicular to (intersecting) the direction of flow of the combustion gas.

From the cooling gas flow inlet (first cooling gas flow inlet) 46a disposed on the right-hand side as viewed in FIG. 12, the cooling gas flows in along a right-to-left direction (first direction) as viewed in FIG. 12. The cooling gas having flowed into the cooling duct 45a through the cooling gas flow inlet 46a flows into the distribution passage (first distribution passage) 47a. The distribution passage 47a is a passage through which the cooling gas having flowed into the cooling gas flow inlet 46a is distributed to the plurality of cooling gas outflow apertures (62a to 62h).

The distribution passage 47a has four branch passages partitioned by four round pipes. The branch passages respectively form passages independent of each other. Also, the distribution passage 47a has partition plates 48a, 48b, 48c, and 48d. Each of the partition plates 48a to 48d is a member in plate form formed of a metallic material or any heat resistant material such as iron and disposed substantially perpendicularly forward of the corresponding branch passage (round tube) (upward as viewed in FIG. 12). Each of the partition plates 48a to 48d is joined by welding to the corresponding branch passage. The cooling gas cannot leak out through the joint therebetween. Each branch passage (round tube) is provided with the cooling gas outflow apertures in two places. The cooling gas having flowed into the branch passage flows out through the cooling gas outflow apertures in the two places.

From the cooling gas flow inlet (second cooling gas flow inlet) 46b disposed on the left-hand side as viewed in FIG. 12, the cooling gas flows in along a left-to-right direction (second direction) as viewed in FIG. 12. The cooling gas having flowed into the cooling duct 45a through the cooling gas flow inlet 46b flows into the distribution passage (second distribution passage) 47b. The distribution passage 47b is a passage through which the cooling gas having flowed into the cooling gas flow inlet 46b is distributed to the plurality of cooling gas outflow apertures (62i to 62p).

The distribution passage 47b has four branch passages partitioned by four round pipes and has partition plates 48f, 48g, 48h, and 48i. Each of the partition plates 48f to 48i is a member in plate form formed of a metallic material or any heat resistant material such as iron and disposed substantially perpendicularly forward of the corresponding branch passage (round tube) (upward as viewed in FIG. 12). Each of the partition plates 48f to 48i is joined by welding to the corresponding branch passage. The cooling gas cannot leak out through the joint therebetween. Each branch passage (round tube) is provided with the cooling gas outflow apertures in two places. The cooling gas having flowed into the branch passage flows out through the cooling gas outflow apertures in the two places.

The distribution passage 47a and the distribution passage 47b are separated from each other by partition plates 48e and 48j. Each of the partition plates 48e and 48j is a member in plate form formed of a metallic material or any heat resistant material such as iron and disposed substantially perpendicularly in the branch passage (round tube). Each of the partition plates 48e and 48j is joined by welding to the inner peripheral surface of the cooling duct 45a so as to close the branch passage (round tube). The coolantcooling gas cannot leak out through the joint therebetween. A gap is provided in advance between the partition plates 48e and 48j by considering thermal elongation of the cooling duct 45 caused by the combustion gas.

In the combustion gas cooling apparatus in the second embodiment, as described above, the distribution passages 47a and 47b are passages partitioned by a plurality of round tubes forming passages independent of each other. Thus, the combustion gas cooling apparatus having the cooling duct 45 having high strength and highly resistant to thermal stress caused by high-temperature combustion gas can be provided.

As described above, high-temperature combustion gas at 500° C. or higher flows into the mixing duct 10 in which the cooling ducts 40 is disposed. In a case where air (atmospheric air) is used as cooling gas flowing through the cooling duct 40, if the temperature of the air is, for example, 20° C., the difference between the temperatures of the cooling gas and the combustion gas is 480° C. or higher. When there is such a temperature difference, thermal stress according to the temperature difference occurs in the outer wall surface forming the cooling duct. There is a strong possibility of the cooling duct 40 being damaged due to the thermal stress or fatigue resulting from changes in thermal stress caused by repeating operating and stopping of the gas turbine. In the third embodiment described below, therefore, a shroud (protective part) 70 is provided outside the cooling duct 40 to protect the cooling duct 40 from the effects of the combustion gas including thermal stress. The shroud 70 is provided so as to cover the outer wall surface of the cooling duct 40.

Third Embodiment

A third embodiment of the present invention will next be described.

The third embodiment is a modification of the first embodiment. The third embodiment differs in that a shroud is provided to protect the cooling duct 40 from the effects of the combustion gas including thermal stress. The third embodiment is a modification of the first embodiment and is generally the same as the first embodiment except for portions particularly described below. Therefore the description for the same portions will not be repeated.

As described with respect to the first embodiment, high-temperature combustion gas at 550° C. or higher flows into the mixing duct 10 in which the cooling ducts 40 is disposed. In a case where air (atmospheric air) is used as cooling gas flowing through the cooling duct 40, if the temperature of the air is, for example, 20° C., the difference between the temperatures of the cooling gas and the combustion gas is 530° C. or higher. When there is such a temperature difference, thermal stress according to the temperature difference occurs in the outer wall surface forming the cooling duct 40. There is a strong possibility of the cooling duct 40 being damaged due to the thermal stress or fatigue resulting from changes in thermal stress caused by repeating operating and stopping of the gas turbine. In the third embodiment, therefore, a shroud (protective part) 70 is provided outside the cooling duct 40 to protect the cooling duct 40 from the effects of the combustion gas including thermal stress.

Figure 14:
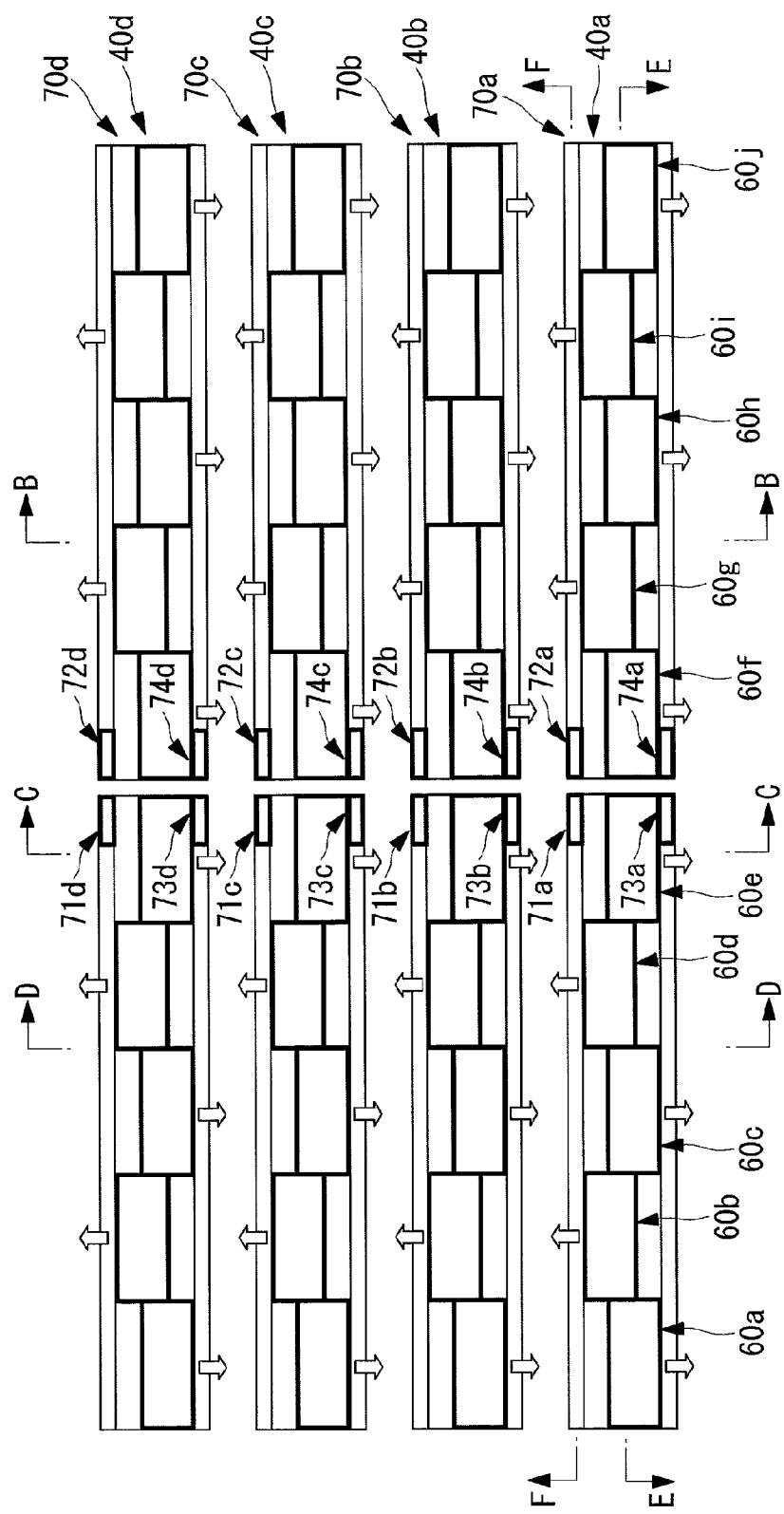
FIG. 14 is a front view of cooling ducts and shrouds in a third embodiment.
Figure 15:
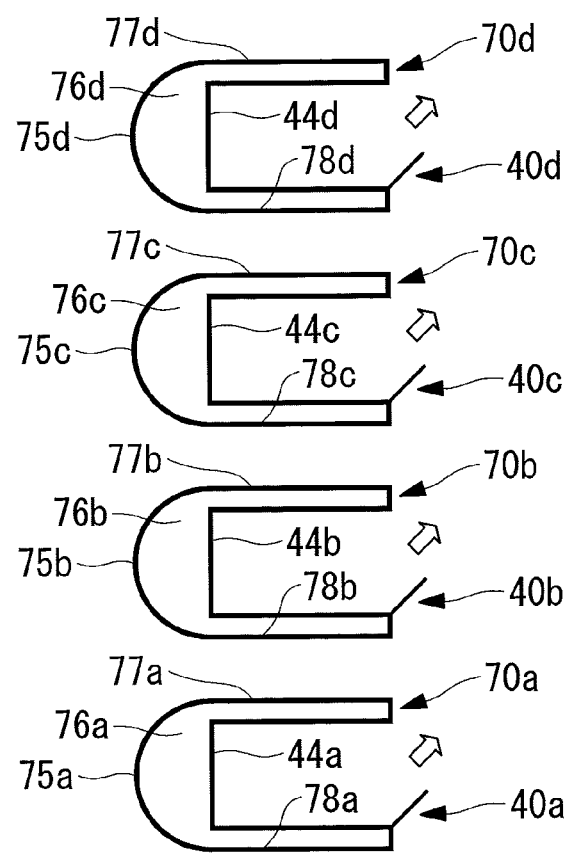
FIG. 15 is a B-B sectional view of the cooling ducts and the shrouds shown in FIG. 14.
Figure 16:
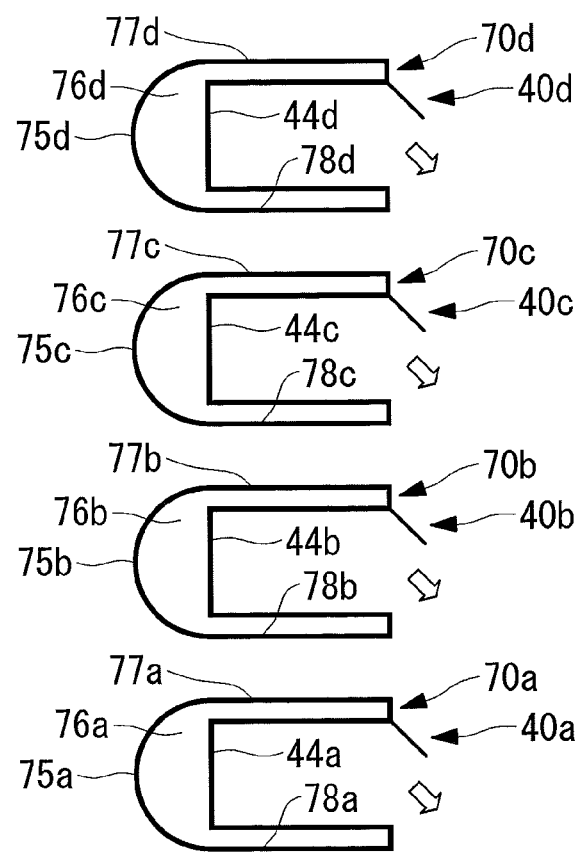
FIG. 16 is a C-C sectional view of the cooling ducts and the shrouds shown in FIG. 14.
Figure 17:
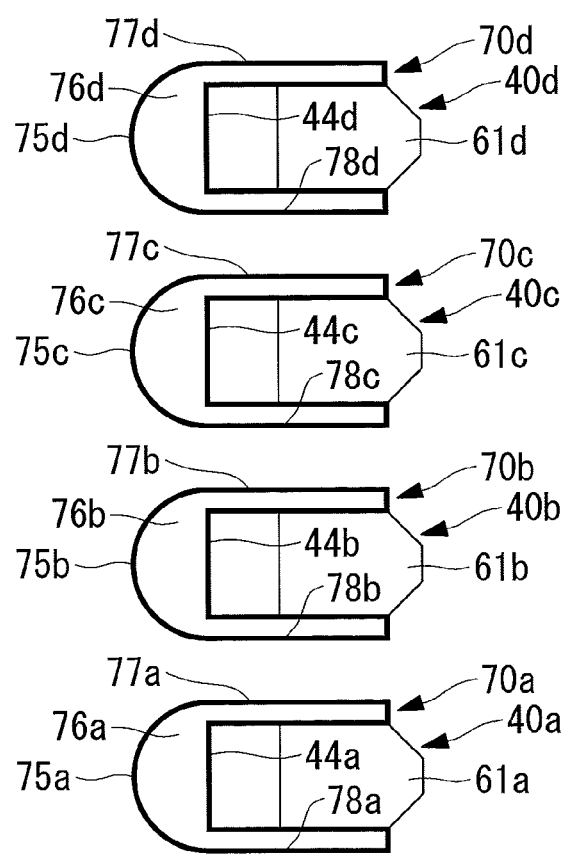
FIG. 17 is a D-D sectional view of the cooling ducts and the shrouds shown in FIG. 14.
Figure 18:
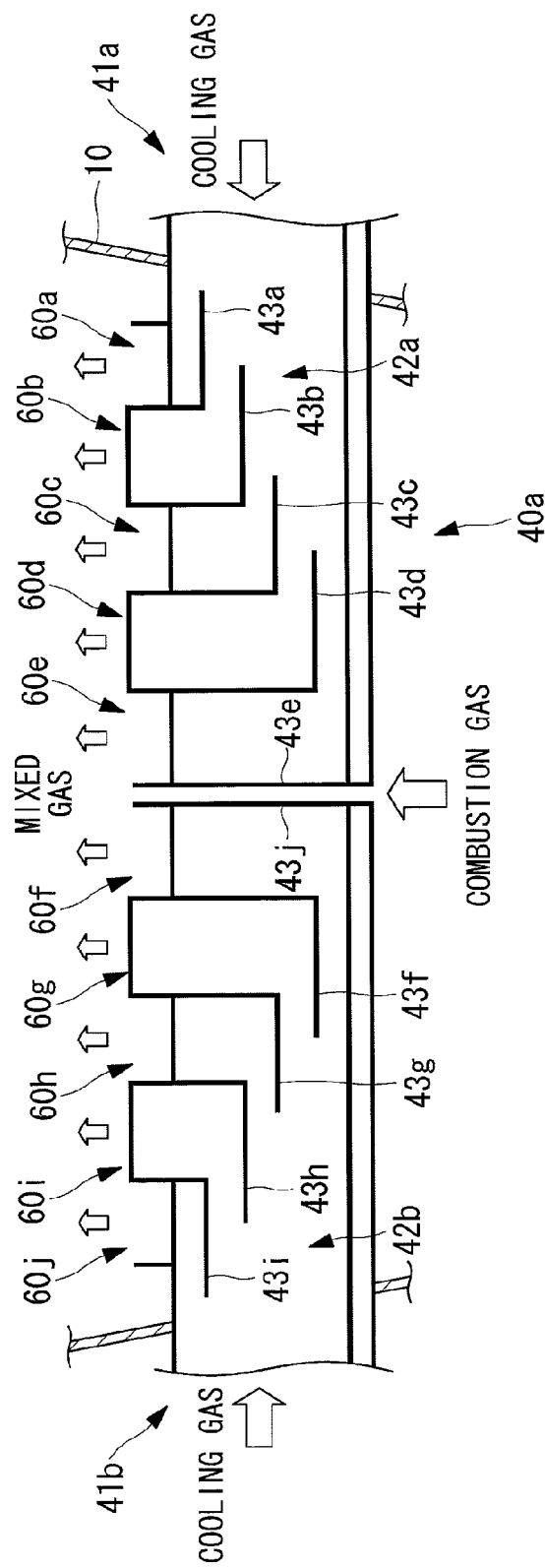
FIG. 18 is an E-E sectional view of the cooling ducts and the shrouds shown in FIG. 14.
Figure 19:
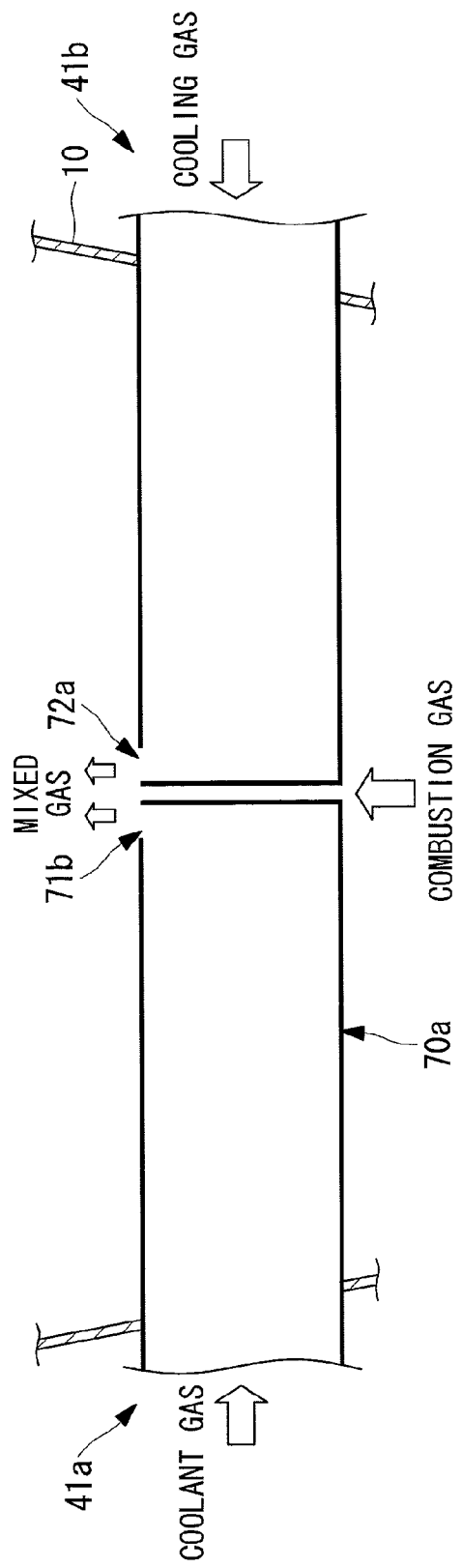
FIG. 19 is an F-F sectional view of the cooling ducts and the shrouds shown in FIG. 14.

FIG. 14 is a front view of cooling ducts and shrouds in the third embodiment. FIG. 14 is a diagram modified from FIG. 3 for the first embodiment, i.e., a front view of cooling ducts and shrouds seen in the direction of arrow A in FIG. 2 for the first embodiment. FIG. 15 is a B-B sectional view of the cooling ducts 40 and the shrouds 70 shown in FIG. 14. FIG. 16 is a C-C sectional view of the cooling ducts 40 and the shrouds 70 shown in FIG. 14. FIG. 17 is a D-D sectional view of the cooling ducts 40 and the shrouds 70 shown in FIG. 14. FIG. 18 is an E-E sectional view of the cooling ducts 40 and the shrouds 70 shown in FIG. 14. FIG. 19 is an F-F sectional view of the cooling ducts 40 and the shrouds 70 shown in FIG. 14.

As shown in FIGS. 14 to 19, the shrouds 70 (70a to 70d) are disposed so as to cover upper outer wall surfaces of the cooling ducts 40 (40a to 40d) and lower outer wall surfaces of the cooling ducts 40 (40a to 40d).

In each shroud 70, thermal insulating gas outflow apertures (thermal insulating gas flow outlets) 71, 72, 73, and 74 through which a thermal insulating gas flows out are disposed in the vicinity of a center in the width direction of the cooling duct 40 (the left-right direction in FIG. 14). Through the thermal insulating gas outflow apertures 71, 72, 73, and 74, the thermal insulating gas having passed through a thermal insulating space 76 described below flows out into the mixing duct 10 along the direction of flow of the combustion gas.

As shown in FIGS. 15 to 17, the shrouds 70 (70a to 70d) have protective surfaces 75 (75a to 75d) for protecting upstream-side outer wall surfaces 44 (44a to 44d) at positions on the upstream sides in the direction of flow of the combustion gas (the left-hand-sides as viewed in FIGS. 15 to 17) in the outer wall surfaces forming the cooling ducts 40 (40a to 40d) in rectangular parallelepiped form. The shrouds 70 (70a to 70d) also have upper connection surfaces 77 (77a to 77d) for protecting upper outer wall surfaces at positions on the upper sides of the cooling ducts 40 (the upper sides as viewed in FIGS. 15 to 17). The shrouds 70 (70a to 70d) also have lower connection surfaces 78 (78a to 78d) for protecting lower outer wall surfaces at positions on the lower sides of the cooling ducts 40 (the lower sides as viewed in FIGS. 15 to 17).

The upper outer wall surface and the lower outer wall surface of each cooling duct 40 are substantially perpendicular to the upstream-side outer wall surface 44. The protective surface 75 and the upper connection surface 77 are joined to each other by welding so that no leakage of the thermal insulating gas occurs. Similarly, the protective surface 75 and the lower connection surface 78 are joined to each other by welding so that no leakage of the thermal insulating gas occurs.

The thermal insulating spaces 76 (76a to 76d) are each formed between the cooling duct 40 and the surfaces of the shroud 70: the protective surface 75, the upper connection surface 77 and the lower connection surface 78. The thermal insulating space 76 is a space independent of the cooling duct 40. The thermal insulating space 76 protects the cooling duct 40 from heat from the combustion gas. Also, by causing the thermal insulating gas to flow through the thermal insulating space 76, the cooling duct 40 can be protected more effectively from heat from the combustion gas. Any of various gases at a temperature lower than that of the combustion gas can be used as the thermal insulating gas. In the present embodiment, air in the atmosphere is used as the thermal insulating gas.

As shown in FIGS. 15 to 17, the sectional shape of the protective surface 75 of the shroud 70 is a circular-arc shape projecting in the upstream direction with respect to the combustion gas flow direction (leftward as viewed in FIGS. 15 to 17). The reason for forming the protective surface 75 so that the protective surface 75 has a circular-arc sectional shape is because the protective surface 75 can have high durability against thermal stress caused by heat from the combustion gas when having such a shape. Also, if the protective surface has a circular-arc sectional shape, the protective surface can be formed as a surface having no welded portion susceptible to thermal stress. The sectional shape of the protective surface 75 is not limited to the above-described circular-arc shape in the present embodiment. Any other shape may suffice if it projects in the upstream direction with respect to the combustion gas flow direction. For example, a V-shape, a trapezoidal shape or the like may be used.

A particularly detailed description will be made of the shroud 70a below. The other shrouds (70b, 70c, and 70d) have the same construction as that of the shroud 70a. Therefore the description for the other shrouds will not be made.

The thermal insulating space 76a includes a space for protecting the upstream-side outer wall surface 44a of the distribution passage 42a, and a space for protecting the upstream-side outer wall surface 44a of the distribution passage 42b. These two spaces are partitioned from each other by partition plates and do not communicate with each other. The thermal insulating space 76a that protects the upstream-side outer wall surface 44a of the distribution passage 42a communicates with the coolantcooling gas flow inlet 41a. Air supplied from the above-described coupling duct flows into the thermal insulating space 76a. The thermal insulating space 76a that protects the upstream-side outer wall surface 44a of the distribution passage 42b communicates with the coolantcooling gas flow inlet 41b. Air supplied from the above-described coupling duct flows into the thermal insulating space 76a.

Accordingly, the cooling gas flow inlet 41a functions as a flow inlet (first thermal insulating gas flow inlet) into which the thermal insulating gas flows, and the cooling gas flow inlet 41b functions as another flow inlet (second thermal insulating gas flow inlet) into which the thermal insulating gas flows.

The thermal insulating gas having flowed into the thermal insulating space 76a through the cooling gas flow inlet 41a flows out into the mixing duct 10 through the thermal insulating gas outflow apertures (first thermal insulating gas flow outlets) 71 and 73, as shown in FIGS. 14 and 19. The thermal insulating gas having flowed into the thermal insulating space 76a through the cooling gas flow inlet 41b flows out into the mixing duct 10 through the thermal insulating gas outflow apertures (second thermal insulating gas flow outlets) 72 and 74, as shown in FIGS. 14 and 19.

As described above, the combustion gas cooling apparatus 100 in the present embodiment has the mixing duct 10 through which a combustion gas flows and the cooling duct 40 from which a coolantcooling gas at a temperature lower than that of the combustion gas flow outs into the mixing duct 10 to form a mixed gas in which the combustion gas and the coolantcooling gas are mixed. Therefore the cooling gas having flowed out from the cooling duct 40 is mixed with the combustion gas to cool the combustion gas. The combustion gas cooling apparatus 100 in the present embodiment also has the shroud 70 that includes the protective surface 75 for protecting at least the upstream-side outer wall surface 44 of the cooling duct at a position on the upstream side in the combustion gas flow direction, and that protects the cooling duct 40 from heat from the combustion gas by causing a thermal insulating gas to flow through the thermal insulating space 76 formed between the upstream-side outer wall surface 44 and the protective surface 75. Thus, the upstream-side outer wall surface 44 at the position on the upstream side in the flow direction, which can be affected most easily by heat from the combustion gas, is suitably protected from heat from the combustion gas.

In the combustion gas cooling apparatus 100 in the present embodiment, the cooling duct 40 has the coolant-cooling gas flow inlets 41a and 41b into which the coolant-cooling gas flows in directions intersecting the combustion gas flow direction, and the cooling gas outflow apertures 60a to 60j through which the cooling gas having flowed into the cooling gas flow inlets 41a and 41b flows out into the mixing duct 10, and the shroud 70 has the cooling gas flow inlets 41a and 41b functioning as thermal insulating gas flow inlets into which the thermal insulating gas flows in directions intersecting the combustion gas flow direction, and the thermal insulating gas outflow apertures 71, 72, 73, and 74 through which the thermal insulating gas having passed through the thermal insulating space 76 in directions intersecting the combustion gas flow direction flows out into the mixing duct 10 along the combustion gas flow direction.

In the combustion gas cooling apparatus 100 in the present embodiment, the cooling gas flows into the cooling duct 40 in directions intersecting the combustion gas flow direction and the thermal insulating gas passes through the thermal insulating space 76 in the same directions, thus enabling sufficiently protecting the upstream-side outer wall surface 44 of the cooling duct 40 from heat from the combustion gas. Also, the thermal insulating gas having passed through the thermal insulating space 76 flows out into the mixing duct 10 along the combustion gas flow direction. Thus, the thermal insulating gas can mix with the combustion gas to cool the combustion gas.

In the combustion gas cooling apparatus 100 in the present embodiment, the sectional shape of the protective surface 75 is a circular-arc shape projecting in the upstream direction with respect to the combustion gas flow direction. This arrangement enables reducing the influence on the protective surface of the pressure of the combustion gas colliding against the protective surface 75.

In the combustion gas cooling apparatus 100 in the present embodiment, the cooling duct 40 is a duct in rectangular parallelepiped form having two outer wall surfaces substantially perpendicular to the upstream-side outer wall surface 44; the shroud 70 has the two connection surfaces 77 and 78 connected to the protective surface 75 and protecting the two outer wall surfaces; and the thermal insulating gas is caused to flow through the thermal insulating space 76 formed between the cooling duct 40 and the protective surface 75 and the two connection surfaces 77 and 78 to protect the cooling duct 40 from heat from the combustion gas. Also, in the combustion gas cooling apparatus 100 in the present embodiment, each of the outer wall surface of the cooling duct in rectangular parallelepiped form: the upstream-side outer wall surface 44 and the two outer wall surfaces substantially perpendicular to the upstream-side outer wall surface 44 is suitably protected by the thermal insulating gas flowing through the thermal insulating space 76.

The combustion gas cooling apparatus 100 in the present embodiment has the thermal insulating gas outflow apertures 71 and 73 and the thermal insulating gas outflow apertures 72 and 74 disposed in the vicinity of the center of the cooling duct 40. This arrangement enables the thermal insulating gas to flow out into a region where the combustion gas flows at a higher rate and the temperature of the combustion gas is high to further improve the effect of cooling the combustion gas.

The combustion gas cooling apparatus 100 in the present embodiment has the expanded duct 20 through which the mixed gas flows and the catalyst part 30 that is provided downstream of the expanded duct 20, that decomposes nitrogen oxides contained in the mixed gas, and that discharges the mixed gas having the nitrogen oxide decomposed. This arrangement enables decomposition of nitrogen oxides contained in the cooled combustion gas to prevent the bad influence on the atmospheric environment.

With the combustion gas cooling apparatus 100 in the third embodiment, steps described below are executed to carry out a combustion gas cooling method.

That is, a step of causing the combustion gas to flow through the mixing duct 10, a step of causing the cooling gas at a temperature lower than that of the combustion gas to flow out through the cooling duct 40 for flowing out the cooling gas into the mixing duct 10 to form the mixed gas in which the combustion gas and the cooling gas are mixed and a protection step of protecting the cooling duct 40 from heat from the combustion gas by causing the thermal insulating gas to flow through the thermal insulating space 76 formed between the protective surface 75 for protecting at least the upstream-side outer wall surface 44 of the cooling duct 40 at a position on the upstream side in the combustion gas flow direction and the upstream-side outer wall surface 44 are executed.

Fourth Embodiment

A fourth embodiment of the present invention will next be described with reference to FIG. 20.

The combustion gas cooling apparatus 100 in the third embodiment has shrouds 70a to 70d on all the four cooling ducts 40a to 40d. In contrast, the combustion gas cooling apparatus 100 in the fourth embodiment has no shrouds 70a and 70d provided on the cooling ducts 40a and 40d while having shrouds 70b and 70c on the cooling ducts 40b and 40c. The fourth embodiment is a modification of the third embodiment and is generally the same as the third embodiment except for portions particularly described below. Therefore the description for the same portions will not be repeated.

Figure 20:
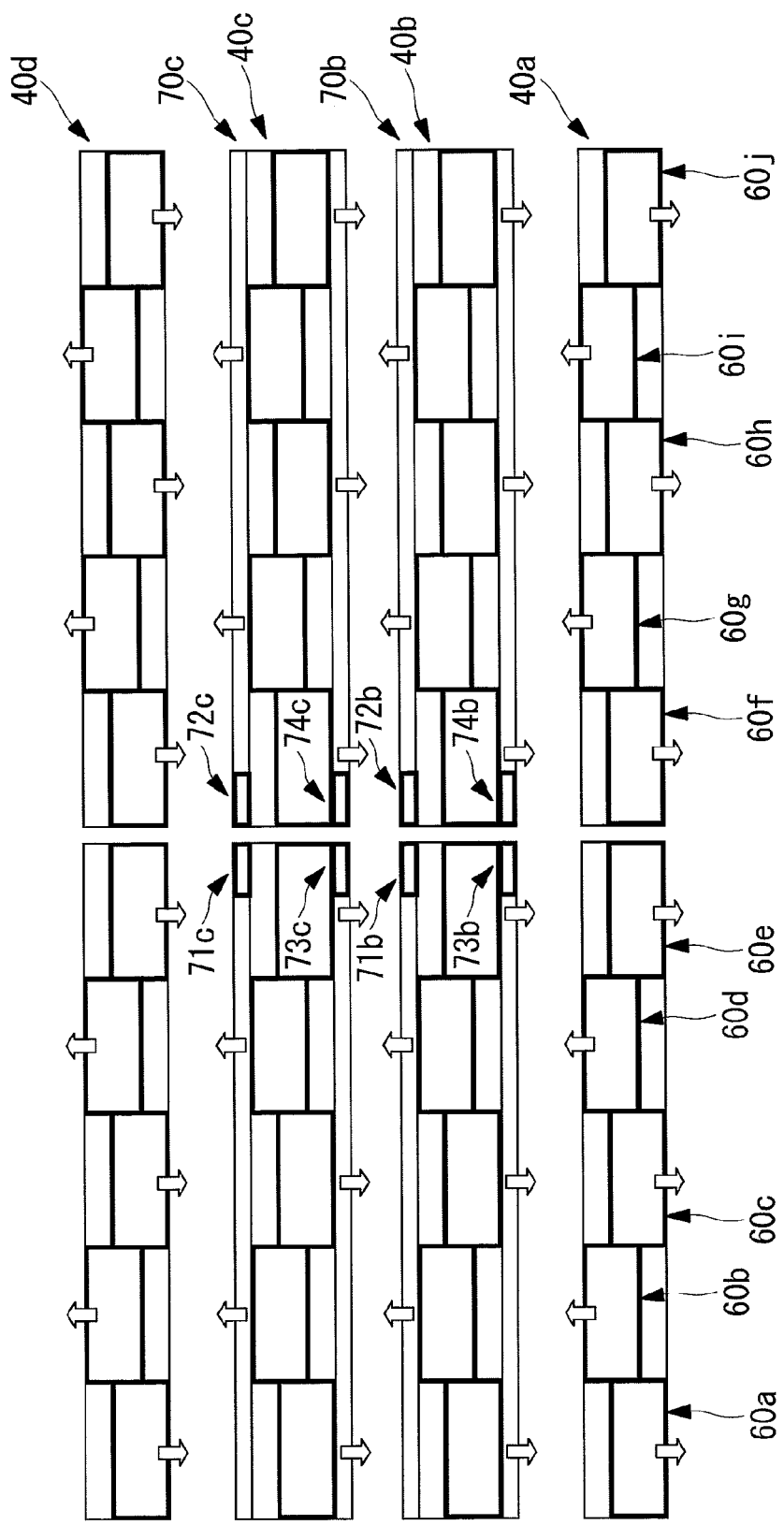
FIG. 20 is a front view of cooling ducts and shrouds in a fourth embodiment.

FIG. 20 is a front view of cooling ducts and shrouds in the fourth embodiment. FIG. 20 is a diagram modified from FIG. 3 for the first embodiment, i.e., a front view of cooling ducts and shrouds seen in the direction of arrow A in FIG. 2 for the first embodiment.

While the combustion gas cooling apparatus 100 in the third embodiment has the shroud 70a disposed so as to cover the cooling duct 40a, the combustion gas cooling apparatus 100 in the fourth embodiment does not have the shroud 70a. Similarly, while the combustion gas cooling apparatus 100 in the third embodiment has the shroud 70d disposed so as to cover the cooling duct 40d, the combustion gas cooling apparatus 100 in the fourth embodiment does not have the shroud 70d.

The combustion gas discharged from the gas turbine (not shown in the figure) flows at a higher rate at a position corresponding to a center of the mixing duct 10 in the height direction. The combustion gas also has a higher temperature at this position. Therefore the cooling duct closer to the position corresponding to the center of the mixing duct 10 in the height direction can be easily affected by thermal stress due to the high-temperature combustion gas. As shown in FIG. 20, the cooling duct 40b and the cooling duct 40c are closer to the position corresponding to the center of the mixing duct 10 in the height direction. The cooling duct 40b and the cooling duct 40c are provided with the shrouds 70b and 70c to be protected from the influence of thermal stress due to the high-temperature combustion gas.

On the other hand, the cooling ducts remoter from the position corresponding to the center of the mixing duct 10 in the height direction cannot easily be affected by thermal stress due to the high-temperature combustion gas. As shown in FIG. 20, the cooling duct 40a and the cooling duct 40d are remoter from the position corresponding to the center of the mixing duct 10 in the height direction. The cooling duct 40a and the cooling duct 40d are provided with no shrouds.

As described above, the combustion gas cooling apparatus 100 in the present embodiment has a plurality of cooling ducts 40 disposed at intervals in the height direction of the mixing duct 10. The combustion gas cooling apparatus 100 in the present embodiment has the shroud 70 for protecting at least one of the cooling ducts 40 from heat from the combustion gas while having no shroud 70 for protecting another of the cooling ducts 40. As a result, the cooling duct that can be easily affected by thermal stress due to the high-temperature combustion gas can be suitably protected.

In the present embodiment, the shrouds 70b and 70c corresponding to the two cooling ducts 40b and 40c closer to the position corresponding to the center of the mixing duct 10 in the height direction are provided. However, the shrouds may be provided in a different way. For example, an arrangement may be adopted in which the shroud 70b corresponding to the cooling duct 40b is provided but the shroud 70c corresponding to the cooling duct 40c is not provided. A selection as to on which one of the four cooling ducts 40 the shroud 70 is provided may be changed as desired based on relationships, for example, with respect to the temperature of the combustion gas, the direction in which the combustion gas flows in and the positions at which the cooling ducts are disposed.

REFERENCE SIGNS LIST

10 Mixing duct (first duct)
20 Expanded duct (second duct)

30 Catalyst part
40, 45 Cooling duct
41, 46 Cooling gas flow inlet
42, 47 Distribution passage
43, 48 Partition plate
50 Inlet duct
60, 62 Cooling gas outflow apertures (cooling gas flow outlet)
70 Shroud (protective part)
75 Protective surface
76 Thermal insulating space
100 Combustion gas cooling apparatus

The invention claimed is:

1. A combustion gas cooling apparatus comprising:
a first duct through which a combustion gas travels; and
a cooling duct from which a cooling gas at a temperature lower than the temperature of the combustion gas flows out into the first duct to form a mixed gas in which the combustion gas and the cooling gas are mixed, the cooling duct having:
a cooling gas flow inlet into which the cooling gas flows;
a plurality of cooling gas flow outlets through which the cooling gas having flowed in through the cooling gas flow inlet flows out into the first duct; and
a distribution passage through which the cooling gas having flowed into the cooling gas flow inlet is distributed to the plurality of cooling gas flow outlets,
wherein the distribution passage is a passage partitioned by a plurality of partition plates connecting a lower surface and an upper surface of the cooling duct.

2. The combustion gas cooling apparatus according to claim 1, wherein the cooling gas flows into the cooling gas flow inlet along a direction intersecting the direction of flow of the combustion gas, and
the plurality of cooling gas flow outlets are disposed at different positions along the intersecting direction.

3. The combustion gas cooling apparatus according to claim 2, wherein the plurality of cooling gas flow outlets include a first cooling gas flow outlet and a second cooling gas flow outlet open in a direction different from the direction in which the first cooling gas flow outlet is open.

4. The combustion gas cooling apparatus according to claim 3, wherein the first cooling gas flow outlet and the second cooling gas flow outlet are alternately disposed along the intersecting direction.

5. The combustion gas cooling apparatus according to claim 2, wherein the cooling duct includes:
a first cooling gas flow inlet into which the cooling gas flows in a first direction along the intersecting direction;
a second cooling gas flow inlet into which the cooling gas flows along a second direction opposite to the first direction;
a first distribution passage through which the cooling gas having flowed into the first cooling gas flow inlet is distributed to the plurality of cooling gas flow outlets; and
a second distribution passage through which the cooling gas having flowed into the second cooling gas flow inlet is distributed to the plurality of cooling gas flow outlets.

6. The combustion gas cooling apparatus according to claim 2, wherein a plurality of the cooling ducts are provided, and
the plurality of cooling ducts are disposed at intervals in a direction perpendicular to the intersecting direction.

7. The combustion gas cooling apparatus according to claim 1, wherein the cooling duct is a duct in rectangular parallelepiped form.

8. A combustion gas cooling apparatus comprising:
a first duct through which a combustion gas travels; and
a cooling duct from which a cooling gas at a temperature lower than the temperature of the combustion gas flows out into the first duct to form a mixed gas in which the combustion gas and the cooling gas are mixed, the cooling duct having:
a cooling gas flow inlet into which the cooling gas flows;
a plurality of cooling gas flow outlets through which the cooling gas having flowed in through the cooling gas flow inlet flows out into the first duct; and
a distribution passage through which the cooling gas having flowed into the cooling gas flow inlet is distributed to the plurality of cooling gas flow outlets,
wherein the distribution passage is a passage partitioned by a plurality of round tubes forming passages independent of each other.

9. The combustion gas cooling apparatus according to claim 1, wherein the temperature of the combustion gas flowing in the first duct is equal to or higher than 500° C.

10. The combustion gas cooling apparatus according to claim 1, wherein air in atmosphere is used as the cooling gas flowing out from the cooling duct into the first duct.

11. A denitration apparatus comprising:
the combustion gas cooling apparatus according to claim 1;
a second duct through which the mixed gas flows; and
a catalyst part provided downstream of the second duct, the catalyst part decomposing nitrogen oxides contained in the mixed gas flowing in from the second duct, the catalyst part discharging the mixed gas having the nitrogen oxide decomposed,
wherein the temperature of the mixed gas at the inlet of the catalyst part is not lower than 300° C. and not higher than 500° C.

12. The combustion gas cooling apparatus according to claim 1, wherein
a protective part having a protective surface for protecting at least an upstream-side outer wall surface of the cooling duct at a position on the upstream side in the direction of flow of the combustion gas, the protective part protecting the cooling duct from heat from the combustion gas with a thermal insulating space formed between the upstream-side outer wall surface and the protective surface.

13. The combustion gas cooling apparatus according to claim 12, wherein a thermal insulating gas is caused to flow through the thermal insulating space formed between the upstream-side outer wall surface and the protective surface.

14. The combustion gas cooling apparatus according to claim 12, wherein the cooling duct includes:
a cooling gas flow inlet into which the cooling gas flows in a direction intersecting the direction of flow of the combustion gas; and
a cooling gas flow outlet through which the cooling gas having flowed into the cooling gas flow inlet flows out into the first duct along the direction of flow of the combustion gas, and the protective part includes:
a thermal insulating gas flow inlet into which the thermal insulating gas flows along the intersecting direction; and
a thermal insulating gas flow outlet through which the thermal insulating gas having passed through the thermal insulating space along the intersecting direction flows out into the first duct along the direction of flow of the combustion gas.

15. The combustion gas cooling apparatus according to claim 14, wherein the cooling duct includes:
a first cooling gas flow inlet into which the cooling gas flows in a first direction along the intersecting direction;
a first cooling gas flow outlet through which the cooling gas having flowed into the first cooling gas flow inlet flows out into the first duct along the direction of flow of the combustion gas;
a second cooling gas flow inlet into which the cooling gas flows along a second direction opposite to the first direction; and
a second cooling gas flow outlet through which the cooling gas having flowed into the second cooling gas flow inlet flows out into the first duct along the direction of flow of the combustion gas, and the protective part includes:
a first flow inlet as the thermal insulating gas flow inlet into which the thermal insulating gas flows along the first direction;
a first flow outlet as the thermal insulating gas flow outlet through which the thermal insulating gas having passed through a first space as the thermal insulating space along the first direction flows out into the first duct along the direction of flow of the combustion gas;
a second flow inlet as the thermal insulating gas flow inlet into which the thermal insulating gas flows along the second direction; and
a second flow outlet as the thermal insulating gas flow outlet through which the thermal insulating gas having passed through a second space as the thermal insulating space along the second direction flows out into the first duct along the direction of flow of the combustion gas.

16. The combustion gas cooling apparatus according to claim 15, wherein the first thermal insulating gas flow outlet and the second thermal insulating gas flow outlet are disposed in the vicinity of a center of the cooling duct.

17. The combustion gas cooling apparatus according to claim 12, wherein the protective surface has a sectional shape projecting in an upstream direction with respect to the direction of flow of the combustion gas.

18. The combustion gas cooling apparatus according to claim 12, wherein the cooling duct is a duct in rectangular parallelepiped form and has two outer wall surfaces substantially perpendicular to the upstream-side outer wall surface, and
the protective part has two connection surfaces connected to the protective surface, the connection surfaces protecting the two outer wall surfaces, the thermal insulating gas being caused to flow through the thermal insulating space formed between the cooling duct and the protective surface and the two connection surfaces to protect the cooling duct from heat from the combustion gas.

19. The combustion gas cooling apparatus according to claim 12, wherein the temperature of the combustion gas flowing in the first duct is equal to or higher than 500° C.

20. The combustion gas cooling apparatus according to claim 12, wherein air in atmosphere is used as the cooling gas flowing out from the cooling duct into the first duct and/or from the thermal insulating space into the first duct.

21. A denitration apparatus comprising:
the combustion gas cooling apparatus according to claim 12;

a second duct through which the mixed gas flows; and
a catalyst part provided downstream of the second duct, the catalyst part decomposing nitrogen oxides contained in the mixed gas flowing in from the second duct, the catalyst part discharging the mixed gas having the nitrogen oxide decomposed,
wherein the temperature of the mixed gas at the inlet of the catalyst part is not lower than 300° C. and not higher than 500° C.

22. A combustion gas cooling apparatus comprising:
a first duct through which a combustion gas travels; and
a cooling duct from which a cooling gas at a temperature lower than the temperature of the combustion gas flows out into the first duct to form a mixed gas in which the combustion gas and the cooling gas are mixed, the cooling duct having:
a cooling gas flow inlet into which the cooling gas flows;
a plurality of cooling gas flow outlets through which the cooling gas having flowed in through the cooling gas flow inlet flows out into the first duct; and
a distribution passage through which the cooling gas having flowed into the cooling gas flow inlet is distributed to the plurality of cooling gas flow outlets,
wherein the cooling gas flows into the cooling gas flow inlet along a direction intersecting the direction of flow of the combustion gas, and
the plurality of cooling gas flow outlets are disposed at different positions along the intersecting direction
wherein the cooling duct includes:
a first cooling gas flow inlet into which the cooling gas flows in a first direction along the intersecting direction;
a second cooling gas flow inlet into which the cooling gas flows along a second direction opposite to the first direction;
a first distribution passage through which the cooling gas having flowed into the first cooling gas flow inlet is distributed to the plurality of cooling gas flow outlets; and
a second distribution passage through which the cooling gas having flowed into the second cooling gas flow inlet is distributed to the plurality of cooling gas flow outlets,
wherein the first distribution passage and the second distribution passage are separated from each other by a partition plate.

23. A combustion gas cooling method of cooling a combustion gas by causing a cooling gas to flow out into a first duct through which the combustion gas flows, the method comprising:
a cooling gas inflow step of causing the cooling gas to flow into a cooling gas flow inlet;
a distribution step of distributing the cooling gas having flowed into the cooling gas flow inlet to a plurality of cooling gas flow outlets by using a distribution passage; and
a cooling gas outflow step of causing the cooling gas distributed in the distribution step to flow into the first duct through the plurality of cooling gas flow outlets and generating a mixed gas in which the combustion gas and the cooling gas are mixed so that a temperature of the mixed gas falls within a predetermined temperature range,
wherein the distribution passage is a passage partitioned by a plurality of partition plates connecting a lower surface and an upper surface of a cooling duct.

24. The combustion gas cooling method according to claim 23 further comprising:
a protection step of protecting the cooling duct from heat from the combustion gas by causing a thermal insulating gas to flow through a thermal insulating space formed between a protective surface for protecting at least an upstream-side outer wall surface of the cooling duct at a position on the upstream side in the direction of flow of the combustion gas and the upstream-side outer wall surface.

* * * * *